United States Patent
Johnson

(10) Patent No.: US 10,056,848 B2
(45) Date of Patent: Aug. 21, 2018

(54) AXIALLY GAPPED ELECTROSTATIC MACHINE HAVING DRIVE STRUCTURE CONFIGURED TO RECYCLE CHARGE

(71) Applicant: Electric Force Motors, LLC, Ashland, VA (US)

(72) Inventor: Weston Clute Johnson, Richmond, VA (US)

(73) Assignee: Electric Force Motors, LLC, Ashland, VA (US)

( * ) Notice: Subject to any disclaimer, the term of this patent is extended or adjusted under 35 U.S.C. 154(b) by 929 days.

(21) Appl. No.: 13/887,308

(22) Filed: May 4, 2013

(65) Prior Publication Data

US 2013/0300252 A1 Nov. 14, 2013

Related U.S. Application Data

(60) Provisional application No. 61/642,884, filed on May 4, 2012.

(51) Int. Cl.
*H02N 1/06* (2006.01)
*H02N 1/00* (2006.01)

(52) U.S. Cl.
CPC ............. *H02N 1/006* (2013.01); *H02N 1/004* (2013.01)

(58) Field of Classification Search
CPC .............................. H02N 1/004; H02N 1/006
USPC ...... 310/254.1, 300, 308, 309, 428; 318/116
See application file for complete search history.

(56) References Cited

U.S. PATENT DOCUMENTS

| | | | |
|---|---|---|---|
| 4,520,300 A | 5/1985 | Fradella | |
| 4,760,303 A * | 7/1988 | Miyake | H02N 1/08 310/308 |
| 4,789,802 A * | 12/1988 | Miyake | H02N 1/08 310/308 |
| 4,997,521 A | 3/1991 | Howe et al. | |
| 5,289,066 A | 2/1994 | Clark | |
| 5,541,465 A * | 7/1996 | Higuchi | H02N 1/004 310/268 |
| 5,982,074 A * | 11/1999 | Smith | H02K 3/04 310/156.36 |
| 6,191,510 B1 | 2/2001 | Landin et al. | |
| 6,353,276 B1 | 3/2002 | Gendron | |
| 6,930,422 B2 * | 8/2005 | Rose | H02K 21/12 310/112 |

(Continued)

OTHER PUBLICATIONS

International Preliminary Report on Patentability for related international application No. PCT/US2013/039601 dated Nov. 4, 2014.

(Continued)

*Primary Examiner* — Bernard Rojas
*Assistant Examiner* — Rashad Johnson
(74) *Attorney, Agent, or Firm* — Troutman Sanders LLP; Ryan Schneider; Micah Hensley

(57) ABSTRACT

Systems, devices, and methods for an electrostatic machine are provided. In one embodiment, an electrostatic machine may be configured to have an electric field motor, a rotor assembly and a motor drive, wherein the improvement may include generating at least three watts (3 W) of power with a product of a gap pressure ($p_{gap}$) and a gap distance ($d_{gap}$) of less than ninety megapascals-micrometer (90 MPa*um).

8 Claims, 43 Drawing Sheets

(56) References Cited

U.S. PATENT DOCUMENTS

| | | | | |
|---|---|---|---|---|
| 7,452,143 B2* | 11/2008 | Matsuki | ................ | H02N 1/004 |
| | | | | 348/E5.028 |
| 8,779,647 B2* | 7/2014 | Sashida | ................ | H02N 1/004 |
| | | | | 310/309 |
| 9,071,118 B2* | 6/2015 | Takemoto | .............. | H02K 21/24 |
| 2009/0066298 A1 | 3/2009 | Post | | |
| 2011/0031844 A1 | 2/2011 | Post | | |
| 2013/0106317 A1* | 5/2013 | Ludois | .................... | H02N 1/00 |
| | | | | 318/116 |
| 2014/0175941 A1* | 6/2014 | Johnson | ................ | H02N 1/006 |
| | | | | 310/309 |

OTHER PUBLICATIONS

International Search Report and Written Opinion of the International Searching Authority for related international application No. PCT/US2013/039601 dated Nov. 1, 2013.

* cited by examiner

Product Datasheet: 1HP, 1PH, 120VAC, 60Hz, IEC-250, TENV, 30RPM

4000

General Characteristics

| Starting Current: | 10.8 Amps | Break-Down Torque: | 190 lb-ft |
|---|---|---|---|
| No-Load Current: | 0.4 Amps | Pull-Up Torque: | 186 lb-ft |
| % Temp. Rise @ Rated Load: | 3 | Locked-Rotor Torque: | 190 lb-ft |
| Start Configuration: | DOL | Full Load Torque: | 190 lb-ft |
| Poles: | 60 | Weight: | 24 lb |

Load Characteristics

| % of Rated Load | 25 | 50 | 75 | 100 |
|---|---|---|---|---|
| Power Factor: | 98.8 | 98.8 | 98.6 | 98.2 |
| Motor Efficiency: | 93.0 | 93.0 | 92.6 | 91.7 |
| Speed: | 30 | 30 | 30 | 30 |
| Line Amperes: | 1.9 | 3.5 | 5.0 | 6.8 |

FIG. 40

AXIALLY GAPPED ELECTROSTATIC MACHINE HAVING DRIVE STRUCTURE CONFIGURED TO RECYCLE CHARGE

CROSS-REFERENCE TO RELATED APPLICATIONS

This application claims priority to U.S. Provisional Patent Application No. 61/642,884, filed May 4, 2012, the contents of which are hereby incorporated by reference as if fully set forth below.

BACKGROUND

Electrostatic machinery may utilize an electric field to generate force and perform a function. FIG. 1 provides a prior art topology of electrostatic machines. The three primary topologies of electrostatic machines are a charge transfer electrostatic machine 103, an electrostatic induction machine 106, and an electret electrostatic machine 107. The charge transfer electrostatic machine 103 may apply charges to various machine elements via mechanical contacts. Because a mechanical contact transfers a charge of the same polarity to an isolated machine element, the machine element may be repelled from the mechanical contact. A charge transfer electrostatic machine 103 may include a spark-gap electrostatic machine 104 and a corona electrostatic machine 105. The spark-gap electrostatic machine 104 may use a brush-like contact to transfer a charge to a conductive element. Similarly, the corona electrostatic machine 105 may use a needle or needle-like component to create charged ions that may be deposited on an insulating element. In either case, a stationary contact of opposite polarity to the charge depositing contact and positioned some distance away from it may be used to neutralize the charge on the isolated mobile element. An electrostatic induction machine 106 may use an external electric field to induce and redistribute charges in a high-impedance body. Due to the high impedance, there may be a beneficial lag time between the creation of an external electric field and the charge redistribution. By continuously shifting the external electric field at a rate faster than the rate that the high-impedance body may redistribute charges, a beneficial reactionary force between the external electric field and the electric field from the charge of the body may be created and used to perform work.

The electret electrostatic machine 107 may include a dielectric electret electrostatic machine 108 and a capacitor electret electrostatic machine 109. The dielectric electret electrostatic machine 108 may have a dielectric permanently polarized through the placement of a fixed charge. The operation of a dielectric electret electrostatic machine 108 may be analogous to the operation of a permanent magnet-based magnetic induction machine. The capacitor electret electrostatic machine 109 may use external electric fields to induce charges to redistribute on an electrically isolated conductor. This process of charge redistribution is similar to the charge redistribution used for the induction electrostatic machine 106 and the dielectric electret electrostatic machine 108. However, unlike the process used for the electrostatic induction machine 106, the process of charge redistribution used for the capacitor electret electrostatic machine 109 may occur without time lag and in a conductive body with zero or negligible impedance. Also, unlike the dielectric electret electrostatic machine 108, the isolated conductor of the capacitor electret electrostatic machine 109 may preferably maintain a net zero charge while maintaining its electrical isolation. The capacitor electret electrostatic machine 109 may also be called a switched capacitance electrostatic machine or a variable capacitance electrostatic machine and may be analogous to the magnetic-based switched reluctance machine.

Independent of the topology, electrostatic machinery has not seen widespread commercial success. For one, it has been difficult to generate a sufficient electric field in a housing or structure of an electrostatic machine that is similar to an existing electromagnetic machine. For another, an electrostatic machine typically requires very large voltages to achieve comparable economic value as that of an electromagnetic machine. However, an electrostatic machine having very large voltages may be difficult to achieve without voltage breakdown or spurious charge loss during operation. Another reason for a lack of commercial success has been a limited understanding of the electric field and its use in commercial applications. Other modern electrostatic machines may use "film-like" designs to create deformation waves between electrodes for creating movement or various protuberances on the film to maintain gap clearance.

Useful forces from electromechanical sources may be developed using several mechanisms as described by the Lorentz force equation, as defined in Equation 1.

$$\vec{F} = q[\vec{E} + v \times \vec{B}] \qquad \text{Equation 1.}$$

While Equation 1 describes multiple options for generating force, such as ion or corona options, producing force utilizing the interaction of a magnetic field ($\vec{B}$) having zero or negligible electric field ($\vec{E}$) of the Lorentz equation is presently the primary commercial mechanism. Most modern electromechanical machines are magnetic-based machines (e.g. magnetic induction motors) and have changed very little since their commercial introduction in the early 1900's. The design and commercial advancement of traditional electromagnetic machines primarily consists of marginal improvements in material or manufacturing processes.

A magnetic machine operates using current to induce a magnetic field. By modulating current flow through electrically conductive windings, typically made of copper, a magnetic field may interact with itself or another magnetic field, often from other windings or permanent magnets, to produce a useful force interaction. While modern machines are almost exclusively magnetic-based machines, it is possible, as described in the Lorentz equation, to create a force-based machine primarily using the electric field. This type of machine may have a zero or negligible magnetic field and may be classified as an electrostatic machine. Traditionally, this type of machine has not been economically viable for large applications for several reasons, including a limited understanding of electric field breakdown in the gap medium, limited manufacturing capabilities, and poor control capabilities. However, the disclosed device overcomes these limitations and permits an electrostatic machine to be efficiently manufactured and economically commercialized, making it useful for modern industry. Furthermore, other desirable features and characteristics of the present disclosure will become apparent from the subsequent detailed description and claims, taken in conjunction with the accompanying figures and the foregoing technical field and background.

SUMMARY OF THE DISCLOSURE

The subject innovation relates to methods, devices, or systems for an electrostatic machine. In one embodiment, an electrostatic machine may be configured to include an electric field motor, a rotor assembly and a motor drive, wherein the improvement may include generating at least three watts (3 W) of power with a product of a gap pressure ($p_{gap}$) and a gap distance ($d_{gap}$) of less than ninety megapascals-micrometer (90 MPa*um). The motor drive may include a control system to, for instance, perform functions associated with charge recovery.

In another embodiment, an electrostatic machine may be configured to include an electric field motor, a rotor assembly and a motor drive, wherein the improvement may include generating at least one hundred and fifty watts (150 W) of power with a product of a gap pressure ($p_{gap}$) and a gap distance ($d_{gap}$) of less than ninety megapascals-micrometer (90 MPa*um).

In another embodiment, an electrostatic machine may be configured to include an electric field motor, a rotor assembly and a motor drive, wherein the improvement may include generating at least three watts (3 W) of power with a magnitude of product of a gap pressure ($p_{gap}$) and a gap distance ($d_{gap}$) less than or equal to a magnitude of each of a height, a length and a width of the electrostatic machine multiplied by two hundred fifty (250), wherein distance measurements are of equal units.

In another embodiment, an electrostatic machine may be configured to include an electric field motor, a rotor assembly and a motor drive, wherein the improvement may include generating at least one hundred and fifty watts (150 W) of power with a magnitude of product of a gap pressure ($p_{gap}$) and a gap distance ($d_{gap}$) less than or equal to a magnitude of each of a height, a length and a width of the electrostatic machine multiplied by two hundred fifty (250), wherein distance measurements use the same units.

In another embodiment, an electrostatic machine may be configured to include an electric field motor, a rotor assembly and a motor drive, wherein the improvement may include using at least ten (10) petals on each rotor member of the rotor assembly and each stator member of the electric field motor.

In another embodiment, an electrostatic machine may be configured to include an electric field motor, a rotor assembly and a motor drive, wherein the improvement may include generating at least one-half (0.5) horsepower and weighing less than eight (8) pounds.

In another embodiment, an electrostatic machine may be configured to include an electric field motor, a rotor assembly and a motor drive, wherein the improvement may include generating at least one (1) horsepower while achieving at least eight-five percent (85%) efficiency.

In another embodiment, an electrostatic machine may be configured to include an electric field motor, a rotor assembly and a motor drive, wherein the improvement may include generating at least one (1) horsepower while achieving at least eight-five percent (85%) efficiency and utilizing a coating on at least one of the plurality of stator members to alter a breakdown voltage characteristics of the electrostatic machine.

In another embodiment, an electrostatic machine may be configured to include an electric field motor, a rotor assembly and a motor drive, wherein the improvement may include generating at least one (1) horsepower and having at least eight (8) poles per voltage phase of the electric field motor.

In another embodiment, an electrostatic machine may be configured to include an electric field motor, a rotor assembly and a motor drive having a charge recycle structure. The electric field motor may include a plurality of stator members. Each of the plurality of stator members may include a plurality of electrically conductive petals. Further, the plurality of electrically conductive petals of each of the plurality of stator members may form a plurality of electrically isolated poles. Each of the plurality of electrically isolated poles may be coupled to one of a plurality of voltage phases of a voltage source. The rotor assembly may be configured to include a plurality of rotor members and a shaft member. The rotor member may have a plurality of electrically isolated conductive petals. The shaft member may be secured to the rotor member. The charge recycle structure may be configured to recycle charge among the plurality of electrically isolated poles. Finally, the rotor assembly may be rotated upon application of the voltage source.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where:

FIG. 40 provides a characteristics table of another embodiment of an electrostatic machine in accordance with various aspects as set forth herein.

DETAILED DESCRIPTION

Figure 1:
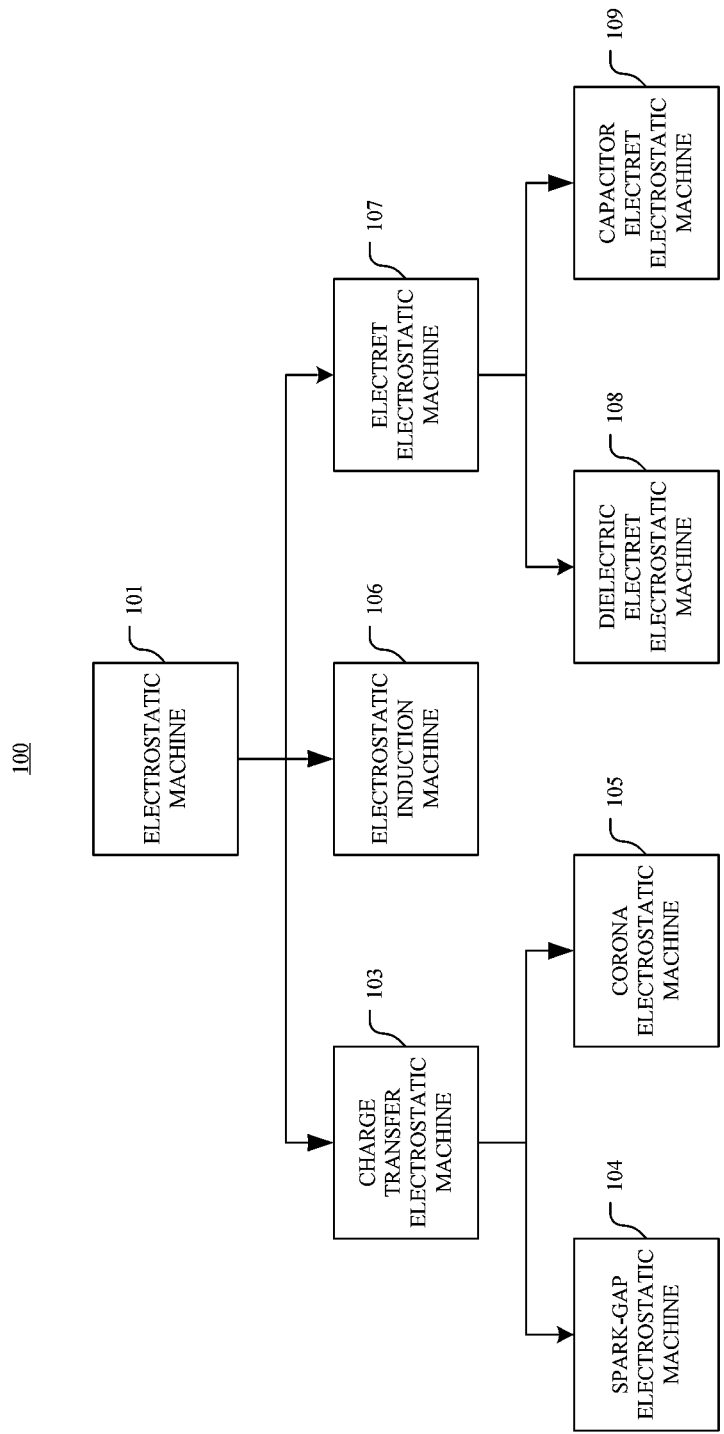
FIG. 1 illustrates a prior art topology of electrostatic machines.

In one definition, a conductor may be an object or type of material that permits the flow of electric charges in one or more directions. In another definition, a conductor may be an object or type of material that may conduct an electric current, including under the influence of an electric field. In one definition, an insulator may be an object or type of material that limits the flow of electric charges in one or more direction. In another definition, an insulator may be an object or type of material that limits conducting of an electric current, including under the influence of an electric field. However, it is important to recognize that an electric field of sufficient magnitude may force an insulator to conduct an electric current. In one example, air is typically an insulator with a commonly accepted dielectric strength, or voltage breakdown strength, of thirty kilovolts per centimeter (30 kV/cm). If air is exposed to an electric field of greater than thirty kilovolts per centimeter (30 kV/cm), then air may breakdown and begin to conduct electricity until the source of the electric field is extinguished. However, if only breakdown of the gap medium is considered, then the commonly accepted dielectric strength value for air does not hold if the product of a gap pressure ($p_{gap}$) and a gap distance ($d_{gap}$) becomes sufficiently small. In such case, the dielectric strength may increase. In one definition, a gap pressure ($p_{gap}$) may refer to the pressure of a gap medium, which may be a fluid such as gas or a liquid. In one example, the gas may be air or hexafluoride gas. In one example, the liquid may be deionized water or mixtures of deionized water and hydrogen peroxide.

An electrostatic machine may be defined by a gap distance between a mobile force-producing surface and a complementary stationary force-producing surface such as a gap distance between a rotor and a stator, respectively; an exterior frame dimension; and power rating. Further, an electrostatic machine may be categorized as a micro-machine or a macro-machine. Also, an electrostatic machine may be a motor, a generator, a solenoid, an actuator, or a similar device that uses electric fields. In one example, an electrostatic machine may achieve a gap distance and pressure product operating in a vicinity of a localized breakdown maxima, as described by the Paschen Curve of FIG. 5. In another example, an electrostatic machine may use specialized coatings to improve electric field strengths, resulting in producing higher power. In another example, a magnitude of each exterior dimension of a housing of an electrostatic machine may have a magnitude of at least two hundred fifty times greater than the magnitude of the product of gap distance ($d_{gap}$) and gap pressure ($p_{gap}$), as described in Equation 2.

$$\|d_{gap}p_{gap}\| \le 250(\|height\| OR \|length\| OR \|width\|),$$  Equation 2.

where distance measurements are of equal units and pressure is measured in megapascals.

An electrostatic machine may achieve a gap distance and pressure product operating in a vicinity of a localized breakdown maxima and may use specialized coatings to produce higher power. In another example, an electrostatic machine may use specialized coatings to produce higher power and may conform to Equation 2. In another example, an electrostatic machine may achieve a gap distance and pressure product operating in a vicinity of a localized breakdown maxima and may conform to Equation 2. In another example, an electrostatic machine may achieve a gap distance and pressure product operating in a vicinity of a localized breakdown maxima, may use specialized coatings to produce higher power, and may conform to Equation 2.

Paschen's Law, as described by Equation 3, provides a breakdown voltage of a medium between two conductive surfaces versus the product of a gap pressure ($p_{gap}$) and a gap distance ($d_{gap}$) at a nominal temperature.

$$V_{breakdown} = f(d_{gap} p_{gap})$$  Equation 3.

Figure 2:
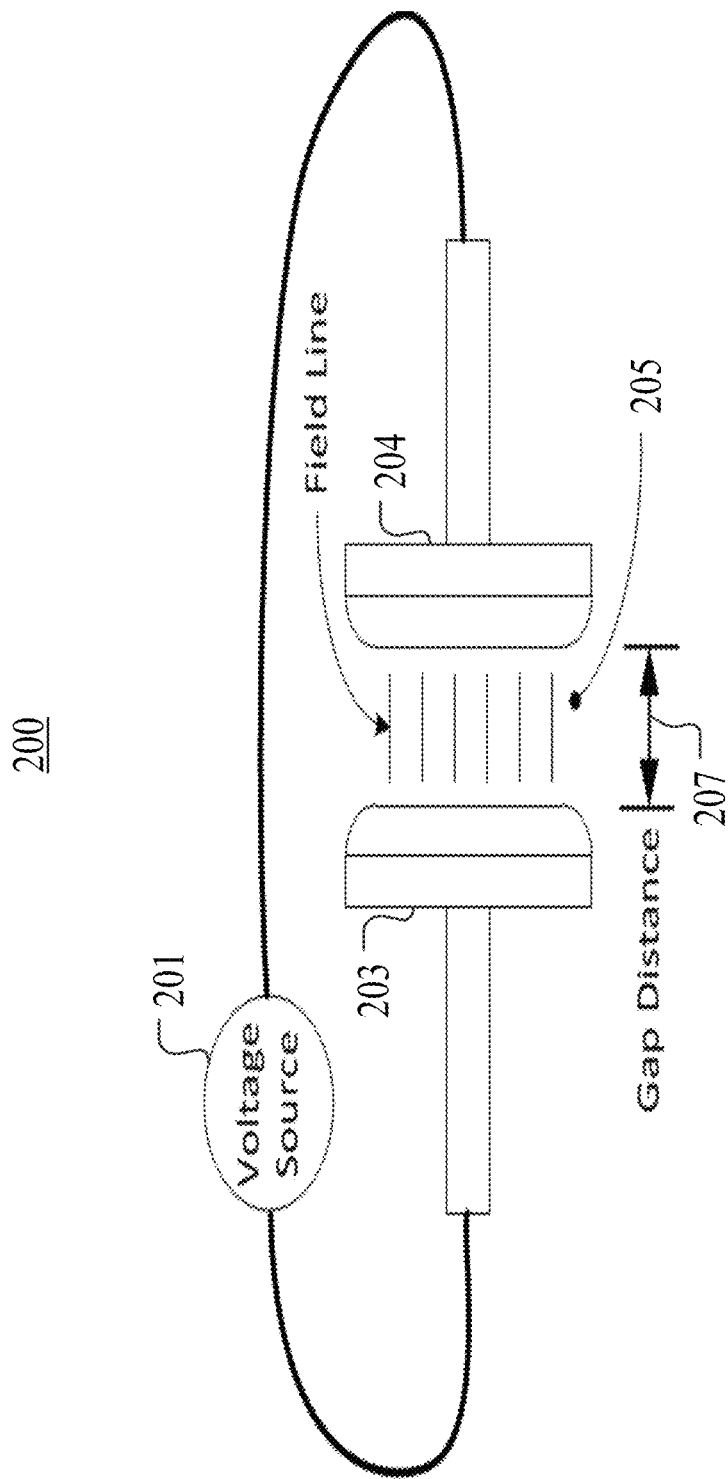
FIG. 2 illustrates a prior art system used to measure voltage breakdown reflecting Paschen's Law.

If a breakdown voltage is exceeded, then the medium between two conductive surfaces may fail; thus, permitting electrical conduction to occur, e.g. arcing. FIG. 2 illustrates a prior art system reflecting Paschen's Law. In FIG. 2, the system 200 may include a voltage source 201, a first and second conductive surfaces 203 and 204, and a gap medium 205. A first end of the voltage source 201 may be coupled to the first conductive surface 203. A second end of the voltage source 201 may be coupled to the second conductive surface 204. The gap medium may reside between the first and second conductive surfaces 203 and 204.

Figure 3:
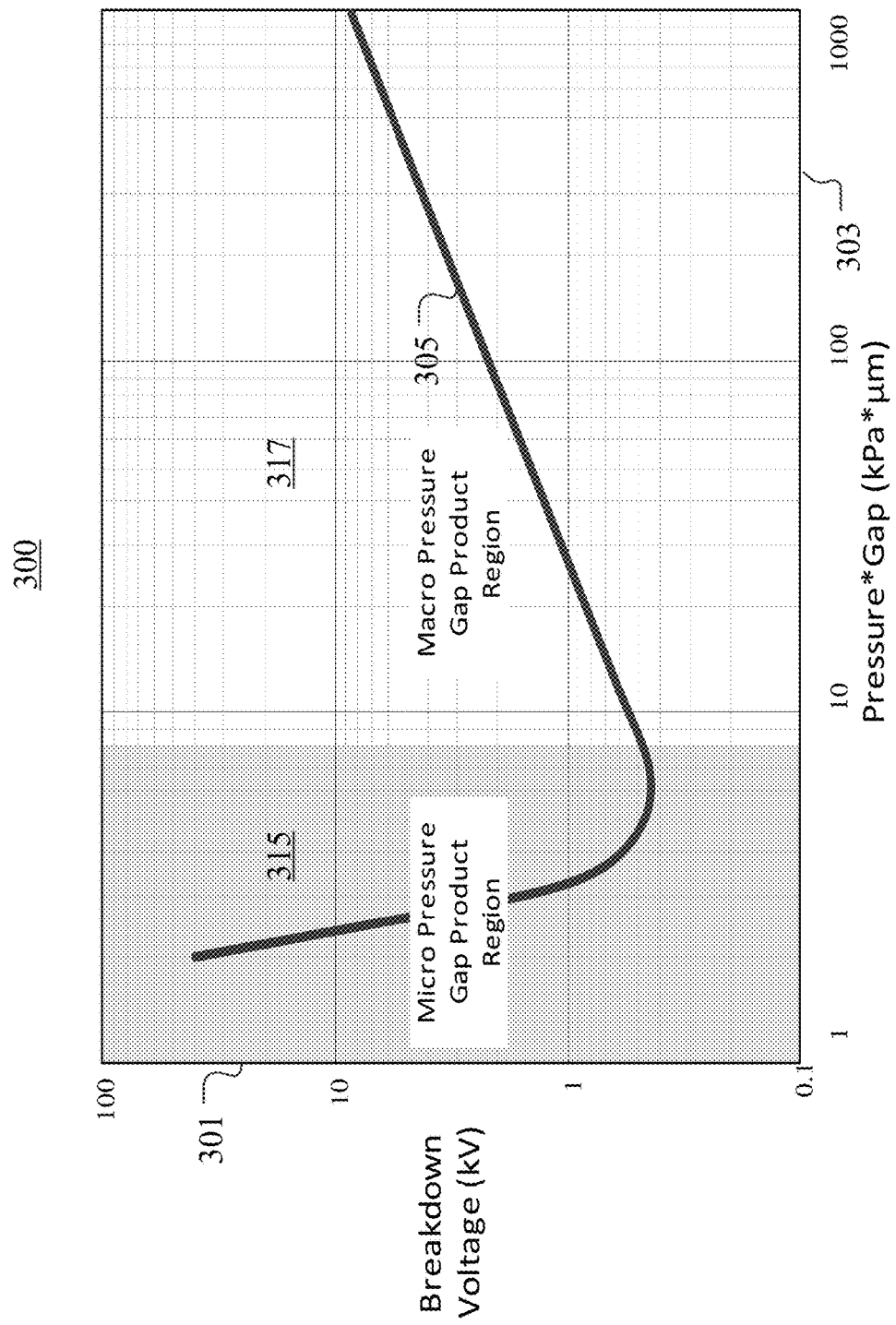
FIG. 3 illustrates an ideal voltage breakdown curve, as described by Paschen's Law, of the prior art system of FIG. 2, wherein only voltage breakdown of the gap medium is considered.

FIG. 3 illustrates an ideal voltage breakdown curve 305, as described by Paschen's Law, of the prior art system 200 of FIG. 2, wherein only voltage breakdown of the gap medium is considered. The voltage breakdown from one-tenth of a kilovolt (0.1 kV) to one hundred kilovolts (100 kV) is plotted on the ordinate 301. Further, the product of a gap pressure ($p_{gap}$) and a gap distance ($d_{gap}$) from one kilopascals-micrometer (1 kPa*um) to one thousand kilopascals-micrometer (1,000 kPa*um) is plotted on the abscissa 303. FIG. 3 shows that the ideal breakdown curve 305 is non-linear. However, the ideal breakdown curve 305 may be linearly approximated for sufficiently large products of a gap pressure ($p_{gap}$) and a gap distance ($d_{gap}$), as shown in a first region 317, such that the breakdown characteristics of the gap medium 205 dominate the breakdown process. A first region 315 of the ideal breakdown curve 305 may be referred to as a micro-pressure gap product region of the ideal breakdown curve 305 and may include the minimum point on the ideal breakdown curve 305. Also, the first region 315 of the curve 305 may be referred to as a non-linear region of the ideal breakdown curve 305. The second region 317 of the curve 305 may be referred to as a macro pressure gap product region. Also, a second region 317 of the curve 305 may be referred to as a linear region of the ideal breakdown curve 305.

In FIG. 3, the first region 315 of the curve 305 shows that larger voltages may be applied to the gap medium 205 when the product of a gap pressure ($p_{gap}$) and a gap distance ($d_{gap}$) is sufficiently small if only breakdown of the gap medium 205 is considered. The first region 315 of the curve 305 may show a non-intuitive effect of the increased ability of the gap medium 205 to sustain larger voltages without breakdown. The increased ability of the gap medium 205 to sustain larger voltages without breakdown may occur for several reasons. First, when a gap distance 207 between the first and second conductive surfaces 203 and 204 is sufficiently small, the gap medium 205 may inhibit avalanche breakdown such as arcing because initiating ions in the gap medium 205 may be precluded from developing the momentum needed to impact other particles in the gap medium 205 in such a manner as to create additional ions. Second, a sufficiently low pressure may exist in the gap between the first and second conductive surfaces 203 and 204 such that there are an insufficient number of initiating ions to create avalanche breakdown. Third, a sufficiently high pressure may exist in the gap between the first and second conductive surfaces 203 and 204 such that particle density may prevent ions in an applied electric field from gaining the momentum necessary to initiate avalanche breakdown. It is important to note that the larger the voltage applied to the first and second conductive bodies 203 and 204, the larger the electric field in the gap medium between the conductive bodies.

When considering a breakdown scenario with more than just ions in the gap medium 205 such as including an electrode or a conductive body, other breakdown mechanisms such as tunneling or field emissions may be included, which may be more difficult to describe using Paschen's Law. These mechanisms may tend to occur between conductors with apt work functions and at a very small product of a gap pressure ($p_{gap}$) and a gap distance ($d_{gap}$). For this reason, the exemplary ideal Paschen Curve of FIG. 3 may not be fully realizable. Instead, an exemplary breakdown curve that is generally achieved for common applications is shown in FIG. 4.

Figure 4:
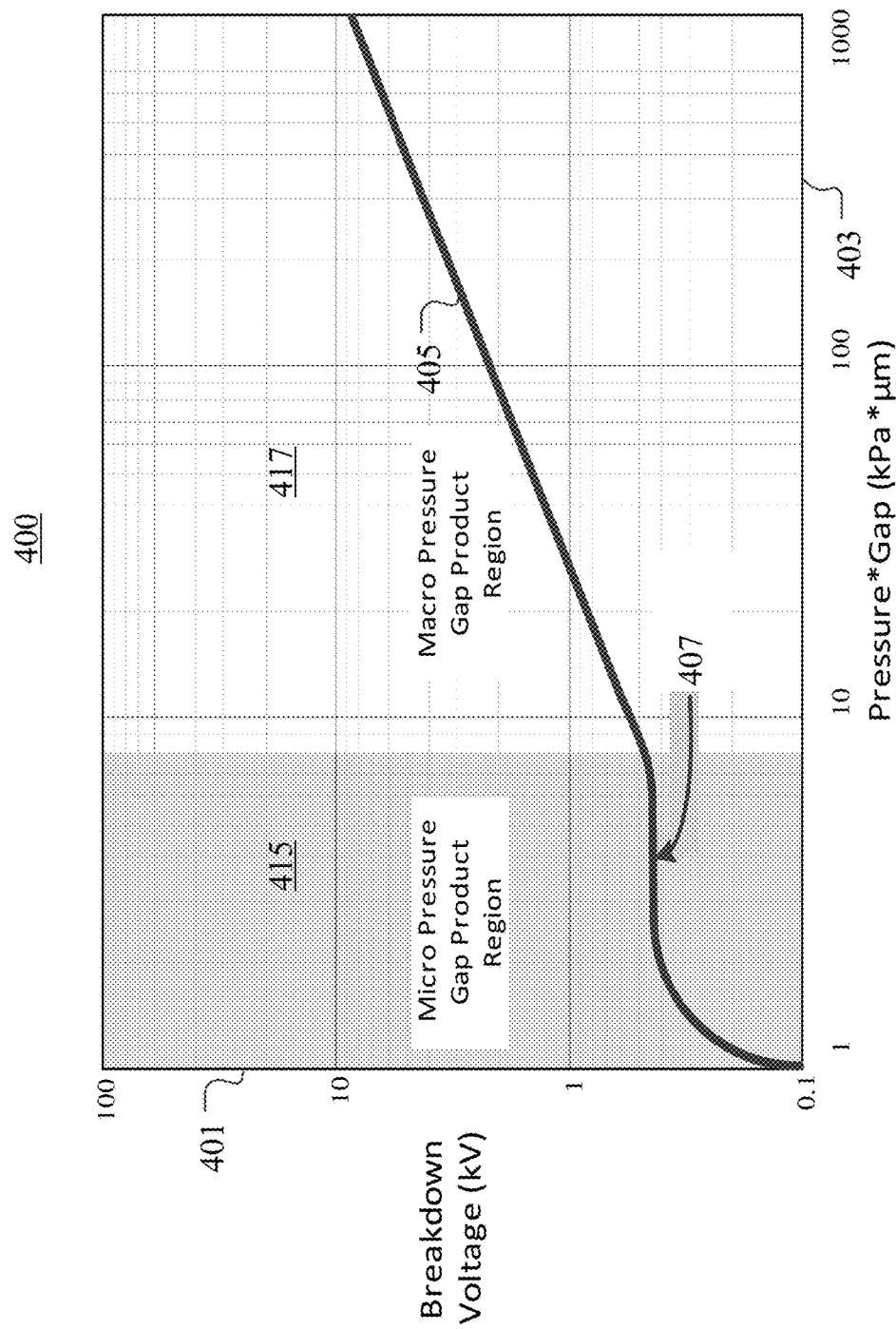
FIG. 4 illustrates an exemplary voltage breakdown curve of the prior art system of FIG. 2, wherein multiple voltage breakdown mechanisms including the type of gap medium is considered.

FIG. 4 illustrates an exemplary voltage breakdown curve 405 of a system with electrodes that approximates the voltage breakdown curve of FIG. 3. The breakdown voltage from one-tenth of a kilovolt (0.1 kV) to one hundred kilovolts (100 kV) is plotted on the ordinate 401. Further, the product of a gap pressure ($p_{gap}$) and a gap distance ($d_{gap}$) from one kilopascals-micrometer (1 kPa*um) to one thousand kilopascals-micrometer (1,000 kPa*um) is plotted on the abscissa 403. A first region 415 of the curve 405 may be referred to as the micro-pressure gap product region. Further, a second region 417 of the curve 405 may be referred to as the macro-pressure gap product region. Despite the improved attributes of operating in the first region 315 of the curve 317 in FIG. 3, a high power electrostatic machine may operate in the second region 417 of the curve 405 because material and manufacturing techniques necessary to produce the large power machine that incorporates small gap distance and pressure product of region 315 in FIG. 3 has been limited. For this reason, voltage breakdown in a typical electrostatic machine has occurred with an exemplary breakdown curve described by FIG. 4.

In FIG. 4, breakdown may not increase with diminishing gap pressure product, but may instead diminish towards zero volts (0 V), possibly after crossing a plateau region 407. Because the improved voltage breakdown characteristics of the first region 315 in FIG. 3 may not be achieved with prior materials and manufacturing techniques in a typical electrostatic machine, the typical electrostatic machine may have to operate in the second region 417, which corresponds to applying larger voltages to potentially achieve economically-viable electric fields. However, the increased voltage control requirements needed to apply these larger voltages may make an electrostatic machine uneconomical.

This disclosure includes describing the use of a coating, which may also be referred to as a specialized layer, such as oxides and polymers with high dielectric strengths to alter a voltage breakdown characteristic between two conductive surfaces. In one example, the oxides and polymers may include parylenes and flourines. The coating may be used to improve an approximation of the ideal Paschen curve, as described in FIG. 3. Further, the coating may be used to create a localized breakdown maxima region due to, for instance, the diminished or delayed effects of tunneling or field emissions when operating in the first region 415. Operating an electrostatic machine in the vicinity of the localized maxima may permit an electrostatic machine to achieve electric field-based force density similar to a traditional magnetic machine, while utilizing lower voltages than used by a traditional electrostatic machine.

Figure 5:
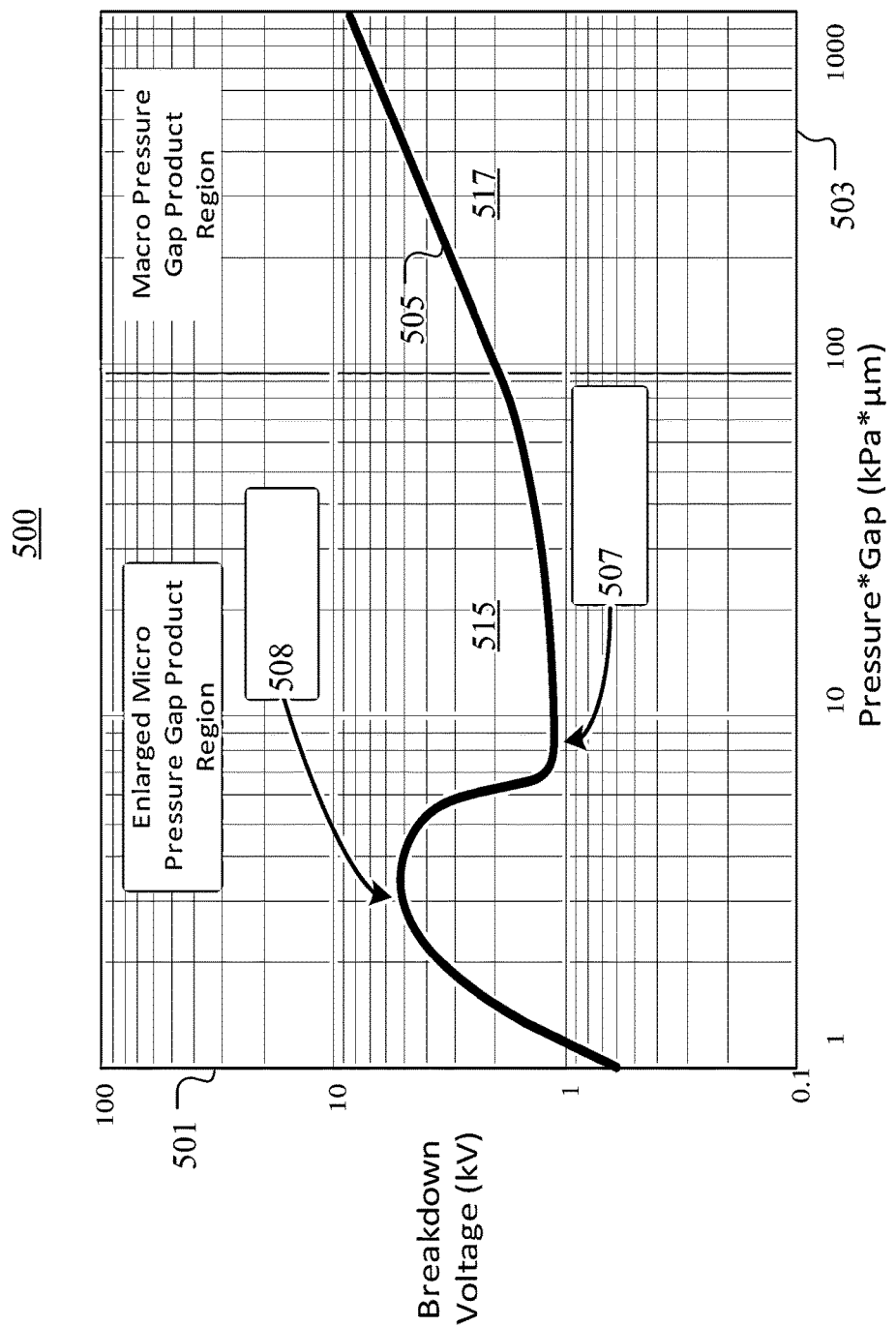
FIG. 5 illustrates an exemplary voltage breakdown curve of an electrostatic machine using a coating to alter the voltage breakdown curve of FIG. 3 in accordance with various aspects set forth herein.

FIG. 5 illustrates an exemplary voltage breakdown curve 505 of an electrostatic machine using a coating to approach or approximate the voltage breakdown curve 305 of FIG. 3. The breakdown voltage from one-tenth of a kilovolt ( 0.1 kV) to one hundred kilovolts ( 100 kV) is plotted on the ordinate 501. Further, the product of a gap pressure ($p_{gap}$) and a gap distance ($d_{gap}$) from one kilopascals-micrometer ( 1 kPa*um) to one thousand kilopascals-micrometer ( 1,000 kPa*um) is plotted on the abscissa 503. A first region 515 of the curve 505 may be referred to as the micro-pressure gap product region. Further, a second region 517 of the curve 505 may be referred to as the macro-pressure gap product region. FIG. 5 shows a first operating point for the electrostatic machine using the coating to create a localized maxima 508. Further, FIG. 5 shows a second operating point for the electrostatic machine using the coating near anelevated localized minima 507. The elevated localized minima 507 may be part of a plateau region, as described in FIG. 4.

It may be desirable to operate electrostatic machinery with a maximum electric field and electric field force density that has been obtained with a minimal applied voltage. This electric field relationship is shown in Equation 4 below, where V is the source voltage, $d_{gap}$ is the gap distance between electrode bodies, and $\vec{E}$ is the resulting electric field of the gap.

$$\vec{E} = -\nabla V \cong -\frac{V}{d_{gap}}, .$$ Equation 4

In one embodiment, an electrostatic machine may be configured to utilize a dielectric coating on a stator member, a rotor member, or both. The dielectric coating, which may also be referred to as a dielectric layer, may be used to alter the voltage breakdown curve. In one example, the dielectric coating may be a parylene or a fluorine. The use of the dielectric coating by the electrostatic machine may allow for changing the shape of the voltage breakdown curve such as shifting the curve in any direction or inducing a plateau area in the voltage breakdown curve, as illustrated in FIG. 5. The plateau area in FIG. 5 may allow for increased electric field densities.

In another embodiment, an electrostatic machine may use one or more plates with appropriately applied conductive areas to increase the total area of electric force producing surfaces.

An electrostatic machine may be described as a microelectrostatic machine or a macro-electrostatic machine. In one definition, the micro-electrostatic machine may be an electrostatic machine having outside encapsulating dimensions of a height, a length and a width with each dimension less than or equal to a few hundred micrometers. In another definition, the micro-electrostatic machine may be an electrostatic machine having outside encapsulating dimensions of a height, a length and a width with each less than or equal to ten millimeters. These small encapsulating dimensions may facilitate operation on the first region of the Paschen curve, as described in FIGS. 3, 4 and 5, as all dimensions, including gap distance, are inherently small. As all dimensions may be of similar relative scale, an individual dimension may not require a tighter tolerance during manufacturing or operation. However, due to the smaller dimensions, a micro-electrostatic machine may have a limited power capability. In one example, a micro-electrostatic machine may operate at or below ten watts (10 W). Further, a microelectrostatic machine may require lower voltages to avoid voltage breakdown.

In one definition, the macro-electrostatic machine may be an electrostatic machine having outside encapsulating dimensions of a height, a length and a width with each dimension greater than a few hundred micrometers. In another definition, the micro-electrostatic machine may be an electrostatic machine having outside encapsulating dimensions of a height, a length and a width with each greater than ten millimeters. In another definition, the micro-electrostatic machine may be an electrostatic machine having outside encapsulating dimensions of a height, a length and a width with each greater than one hundred millimeters. These small encapsulating dimensions may facilitate operation on the second region of the Paschen curve, as described in FIGS. 3, 4 and 5, as all dimensions, including gap distance, are inherently small. Prior art electrostatic machinery that are classified as a macro-electrostatic machine operate in the macro pressure gap product region of the Paschen curve and have primarily utilized electrostatic induction and charge transfer techniques to operate. Despite being physically large, prior art electrostatic machinery could not achieve electric field force densities on par with comparably sized magnetic field based machines. Additionally, the generation and control of voltages sufficient to produce commercially viable electric forces were difficult to achieve with prior art manufacturing and material capabilities. For these reasons, prior art macro-electrostatic machines failed to be economically viable compared to comparably-sized magnetic induction machines.

In another embodiment, an electrostatic machine may be a non-commutated capacitive electret, which may be a switched capacitance electrostatic machine or a variable capacitance electrostatic machine.

In another embodiment, an electrostatic machine may be synchronous or asynchronous.

In another embodiment, an electrostatic machine may modulate applied voltages between a plurality of electrically isolated poles to distribute charge, producing useful forces.

In another embodiment, an electrostatic machine may include an electric field motor having a plurality of stator members. Each of the plurality of stator members may include a plurality of electrically conductive poles. Further, the plurality of electrically conductive poles of each of the plurality of stator members may form a plurality of electrically isolated poles with each of the plurality of electrically isolated poles coupled to a different phase of a voltage source.

Figure 6:
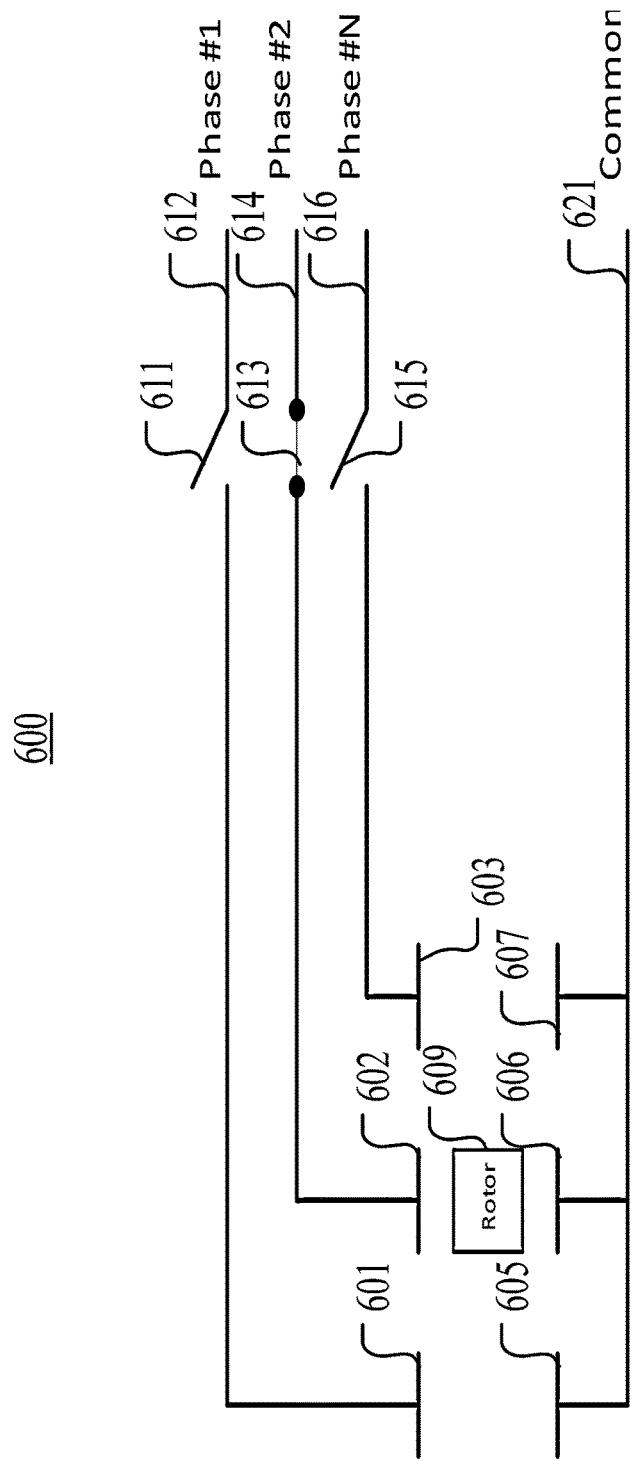
FIG. 6 illustrates one embodiment of a capacitive electret system for charge recovery in an electrostatic machine in accordance with various aspects as set forth herein.

The electrostatic machine may modulate applied voltages between a plurality of electrically isolated poles to distribute charge, producing useful forces. FIG. 6 illustrates one embodiment of a system 600 for charge recovery in an electrostatic machine in accordance with various aspects as set forth herein. In FIG. 6, the system 600 may be configured to include a rotor member 609 having a plurality of electrically isolated conductive poles, a first stator member having a plurality of electrically conductive poles 601, 602 and 603, a second stator member having a plurality of electrically conductive poles 605, 606 and 607, a plurality of switches 611, 613 and 615, a plurality of phase voltages 612, 614 and 616, and an electrical common 621. One of a plurality of electrically isolated conductive poles of a rotor member may also be referred to as a rotor pole. Similarly, one of a plurality of electrically conductive poles of a stator member may also be referred to as a stator pole. In one example the number of rotor and stator poles are not equal. In one example, the electrostatic machine may be a three-phase, capacitive electret electrostatic machine, which may also be referred to as a switched-capacitor electrostatic machine or variable capacitance electrostatic machine. The rotor member may be electrically isolated. The system 600 may be configured to perform charge recovery by recycling electric charge throughout an operating sequence of the electrostatic machine. Further, charge recycling may be unique to electrostatic machines.

In operation, a charge may be placed from one of the plurality of phase voltages 612, 614 and 616 onto one of the plurality of electrically conductive poles 601, 602, 603, 605, 606 and 607 of the first stator member when one of the plurality of switches 611, 613 and 615 is closed. The electric field from the charge placed on one of the plurality of electrically conductive poles 601, 602, 603, 605, 606 and 607 of the first and second stator members may induce an electric field on an adjacent rotor pole of the plurality of electrically isolated conductive poles of the rotor member 609. The external electric field from the plurality of stator members may extend to the adjacent rotor pole, in turn, may cause charges to redistribute on the rotor pole. The redistributed charges on the rotor pole may remain in place so long as the external electric field exists.

Figure 7:
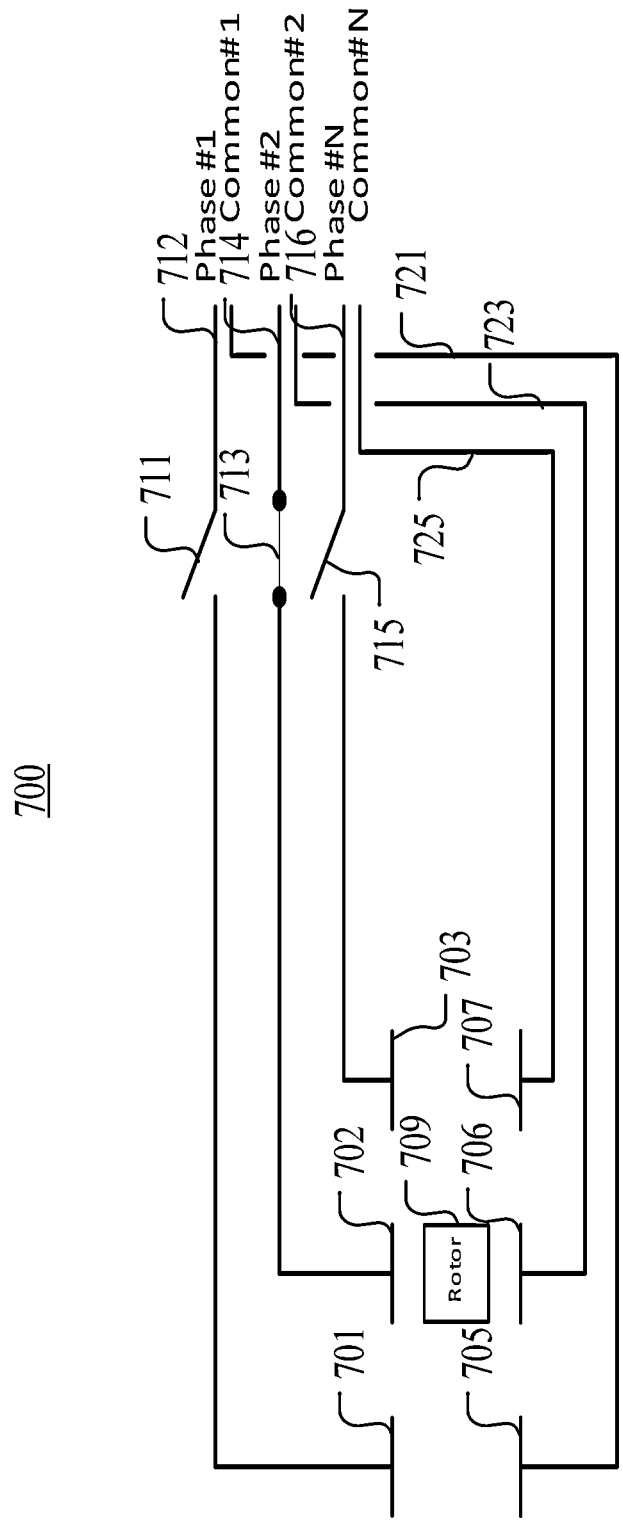
FIG. 7 illustrates another embodiment of a capacitive electret system for charge recovery in an electrostatic machine in accordance with various aspects as set forth herein.

FIG. 7 illustrates another embodiment of a charge recovery system 700 in an electrostatic machine in accordance with various aspects as set forth herein. In FIG. 7, the charge recovery system 700 may be configured to include a rotor member 709 having a plurality of electrically isolated conductive poles, a first stator member having a plurality of electrically conductive poles 701, 702 and 703, a second stator member having a plurality of electrically conductive poles 705, 706 and 707, a plurality of switches 711, 713 and 715, a plurality of phase voltages 712, 714 and 716, and a plurality of phase commons 721, 723 and 725. One of a plurality of electrically isolated conductive poles of a rotor member may also be referred to as a rotor pole. Similarly, one of a plurality of electrically conductive poles of a stator member may also be referred to as a stator pole. In one example, the electrostatic machine may be a three-phase, switched-capacitor electrostatic machine. The rotor member may be electrically isolated. The system 700 may be configured to perform charge recovery by recycling electric charge throughout an operating sequence of the electrostatic machine. Further, charge recycling may be unique to electrostatic machines.

In operation, a charge may be placed from one of the plurality of phase voltages 712, 714 and 716 onto one of the plurality of electrically conductive poles 701, 702, 703, 705, 706 and 707 of the first stator member when one of the plurality of switches 711, 713 and 715 is closed. The electric field from the charge placed on one of the plurality of electrically conductive poles 701, 702, 703, 705, 706 and 707 of the first and second stator member may induce an electric field on an adjacent rotor pole of the plurality of electrically isolated conductive poles of the rotor member 709. The external electric field from the plurality of stator members may extend to the adjacent rotor pole, in turn, may cause charges to redistribute on the rotor pole. The redistributed charges on the rotor pole may remain in place so long as the external electric field exists.

Since an external electric field may be created by static charges, charges not in motion or in limited motion, an electrostatic machine may have unique features. First, since the charge is static, a voltage source may be disconnected from an electrostatic machine without eliminating the placed charge. Thus, an electromagnetic machine may allow static charges and their associated electric forces to remain after the voltage source is disconnected from the electromagnetic machine. This is analogous to a capacitor remaining charged after being disconnected from its voltage source. Second, the operating mechanism of an electrostatic machine may come from Columbic forces inherent to a charge. Once the static charge is placed, it remains fixed on a stator pole, even if the current source is disconnected. A person of ordinary skill in the art will recognize that static charges may dissipate over time and at certain rates due to factors such as temperature, pressure and humidity. The use of static charges may be unique to electrostatic machines. A common induction motor may utilize magnetic fields generated by currents which are naturally eliminated when a voltage source is disconnected. For continuous operation, an electrostatic machine may continuously reposition charges between a plurality of electrically isolated poles with each of the plurality of electrically isolated poles coupled to one of a plurality of voltage phases of a voltage source, which necessitates the removal of charge and, to achieve higher efficiency, wherein repositioning of the charge must be captured and recovered rather than dissipated. Through this capture and recovery technique, an overall efficiency of an electrostatic motor and its controls may be improved.

Charge recovery may be accomplished using a number of techniques including using a combination of high and low voltage direct current (DC) buses or phase-pulsed alternating current (AC) systems, which may inherently recover charge.

Figure 8:
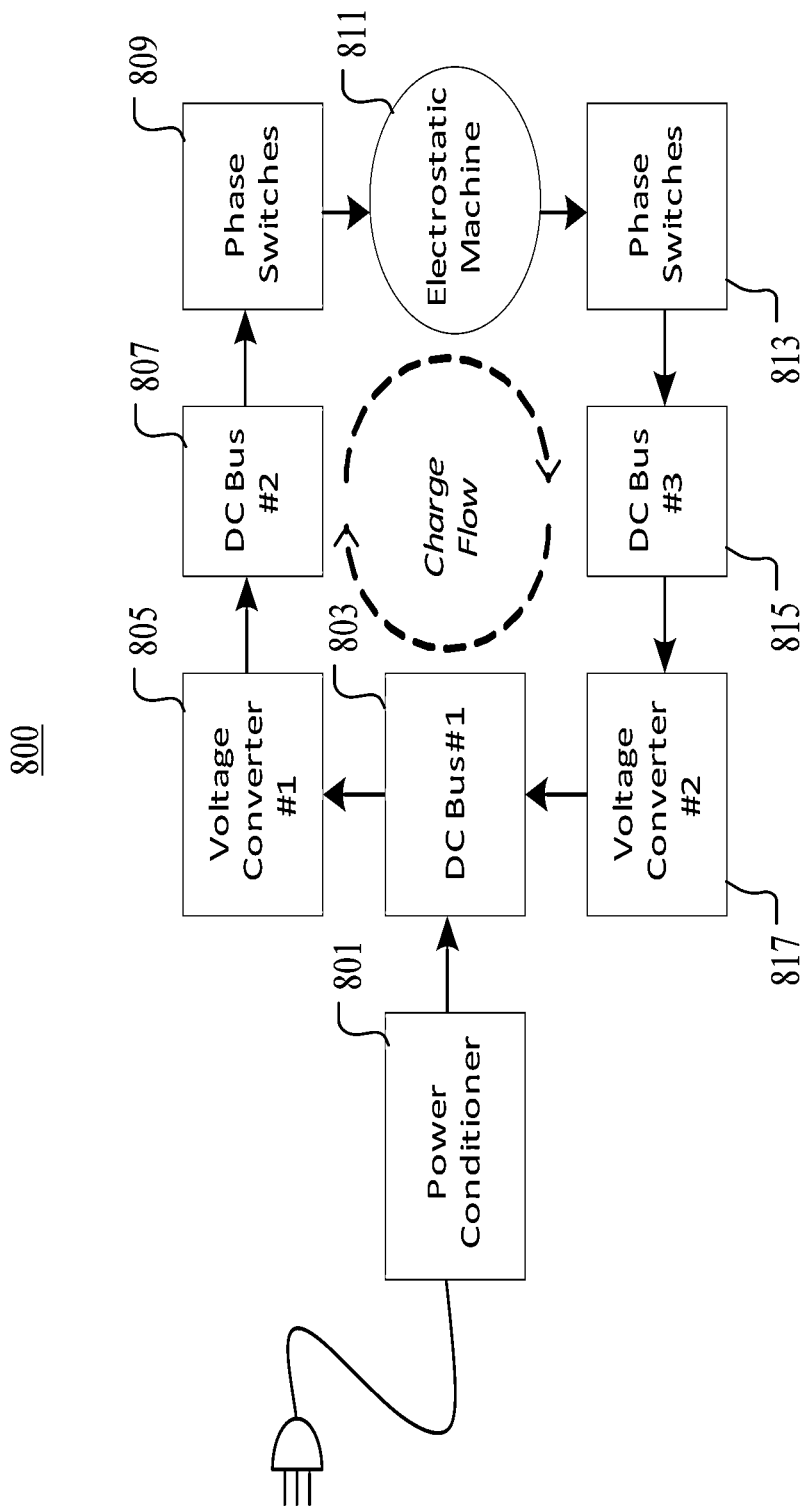
FIG. 8 illustrates one embodiment of a control system topology for charge recovery in an electrostatic machine in accordance with various aspects as set forth herein.

FIG. 8 illustrates one embodiment of a control system topology 800 for charge recovery in an electrostatic machine 811 in accordance with various aspects as set forth herein. In FIG. 8, the topology 800 may be configured to include a power conditioner 801, a first DC bus 803, a first voltage converter 805, a second DC bus 807, a first set of phase switches 809, an electrostatic machine 811, a second set of phase switches 813, a third DC bus 815, and a second voltage converter 817. The power conditioner 801 may be configured to provide DC voltage on the first DC bus 803 from an AC power supply such as a three phase, two hundred and twenty volt (220 V), sixty (60) Hertz line or a battery. In one example, the first DC bus 803 may be a low voltage DC bus. The first voltage converter 805 may be configured to convert the DC voltage on the first DC bus 803 for output on the second DC bus 807. The converted DC voltage on the second DC bus 807 may then be applied to the electrostatic machine 811 using the first set of phase switches 809. The converted DC voltage may be collected from the electrostatic machine 811 onto the third DC bus 815 using the second set of phase switches 813. In one example, the first DC bus 803 may be a low-voltage DC bus, the second DC bus 807 may be a high-voltage DC bus, and the third DC bus 815 may be a low-voltage DC bus. To complete the cycle of charge recovery, the second voltage converter 817 may be configured to recover the collected converted phased DC voltages to their original phased DC voltage form on the first DC bus 803. A charge recovery structure may include portions of the control system topology 800. Further, a motor drive may be configured to include the charge recovery structure. In one example, the charge recovery structure may include the first DC bus 803, the first voltage converter 805, the second DC bus 807, the first set of phase switches 809, the second set of phase switches 813, the third DC bus 815, and the second voltage converter 817. A person of ordinary skill in the art will recognize various forms of charge recovery for electrostatic motors and their associated controls.

In FIG. 8, in operation, a low voltage AC or DC source may be conditioned using the power conditioner 801 to reduce any negative effects on the performance of the electrostatic machine 811 caused by the low voltage AC or DC source. Conditioning of a voltage from the low voltage AC or DC source by the power conditioner 801 may include reducing harmonics and performing power factor correction. The conditioned voltage of the power conditioner 801 may then be output to a low voltage DC bus 803. Energy and charge from the low voltage DC bus 803 may then be converted and transferred using the voltage converter 805 to a high voltage DC bus 807. The high voltage DC bus 807 may then transfer energy and charge through the phase switches 809 to the plurality of voltage phases of an electrostatic machine 811. The high voltage and charge on the plurality of voltage phases of the electrostatic machine 811 may then be transferred through additional phase switches 813 to another low voltage DC bus 815. Energy and charge from the low voltage DC bus 815 may then be converted and transferred using the voltage converter 817 back to the low voltage DC bus 803. The control system topology 800 may produce efficiencies of at least eighty-five percent (85%). Additionally, the charge recycle structure represented by 803, 805, 807, 809, 811, 813, 815, 817 and back to 803 may have efficiencies of at least eighty-five percent (85%).

Figure 9:
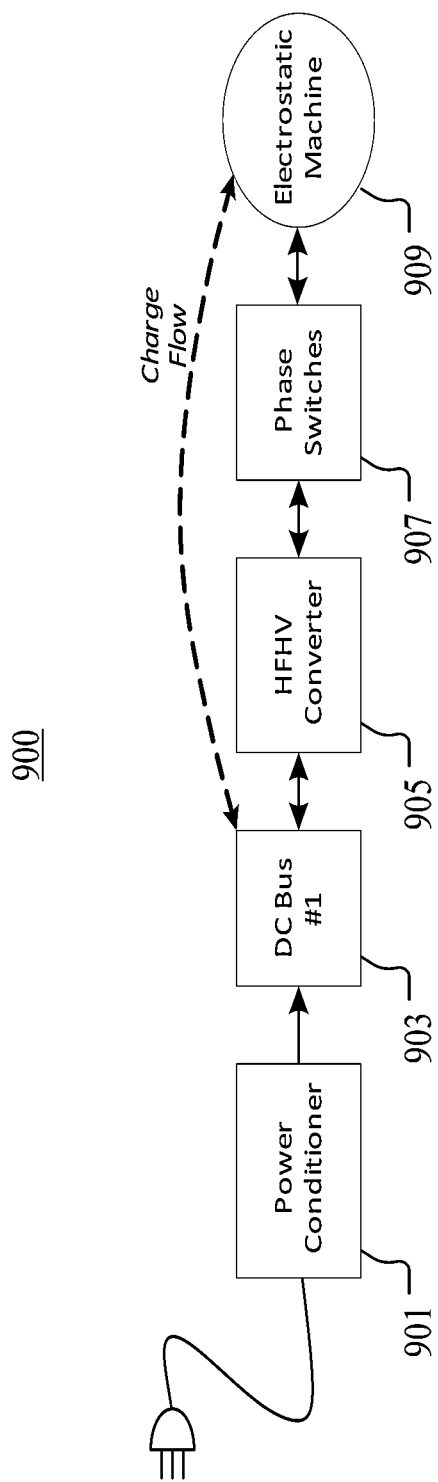
FIG. 9 illustrates another embodiment of a control system topology for charge recovery in an electrostatic machine in accordance with various aspects as set forth herein.

FIG. 9 illustrates another embodiment of a control system topology 900 for charge recovery in an electrostatic machine in accordance with various aspects as set forth herein. In FIG. 9, the topology 900 may be configured to include a power conditioner 901, a first DC bus 903, a first voltage converter 905, a first set of phase switches 909, and an electrostatic machine 911. The power conditioner 901 may be configured to provide DC voltage on the first DC bus 903 from an AC power supply such as a three phase, two hundred and twenty volt (220 V), sixty (60) Hertz line or a battery. The first voltage converter 905 may be configured to convert the DC voltage on the first DC bus 903 for output to the first set of phase switches 909. In one example, the first voltage converter 905 may be a high frequency high voltage (HFHV) transformer. The converted DC voltage from the first voltage converter 905 may be applied to the electrostatic machine 911 using the first phase switches 909. To complete the cycle of charge recovery, the converted phased DC voltages may be collected from the electrostatic machine 911 onto the first DC bus 903. In one example, the first DC bus 903 may be a low-voltage DC bus. A charge recovery structure may include portions of the control system topology 900. A motor drive may be configured to include the charge recovery structure. In one example, the charge recovery structure may include the first DC bus 903, the first voltage converter 905, and the first set of phase switches 909.

In FIG. 9, in operation, a low voltage AC or DC source may be conditioned using the power conditioner 901 to minimize any negative effects on the performance of the electrostatic machine 911 caused by the low voltage AC or DC source. Conditioning of a voltage from the low voltage AC or DC source by the power conditioner 901 may include reducing harmonics and performing power factor correction. The conditioned voltage of the power conditioner 901 may then be transferred to a low voltage DC bus 903. Energy and charge from the low voltage DC bus 903 may then be transferred using an HFHV converter 905 through phase switches 907 to various phases of an electrostatic machine 909. In one example, the phase switches 907 may be open or close at or near zero crossings of the HFHV converter 905. The control system topology 900 may have efficiencies of at least eighty-five percent (85%). Additionally, the charge recycle structure represented by a processing loop from 903, 905, 907, and 909 may have efficiencies of at least eighty-five percent (85%). A person of ordinary skill in the art will recognize various alternative forms of charge recovery for electrostatic motors and their controls.

Figure 10:
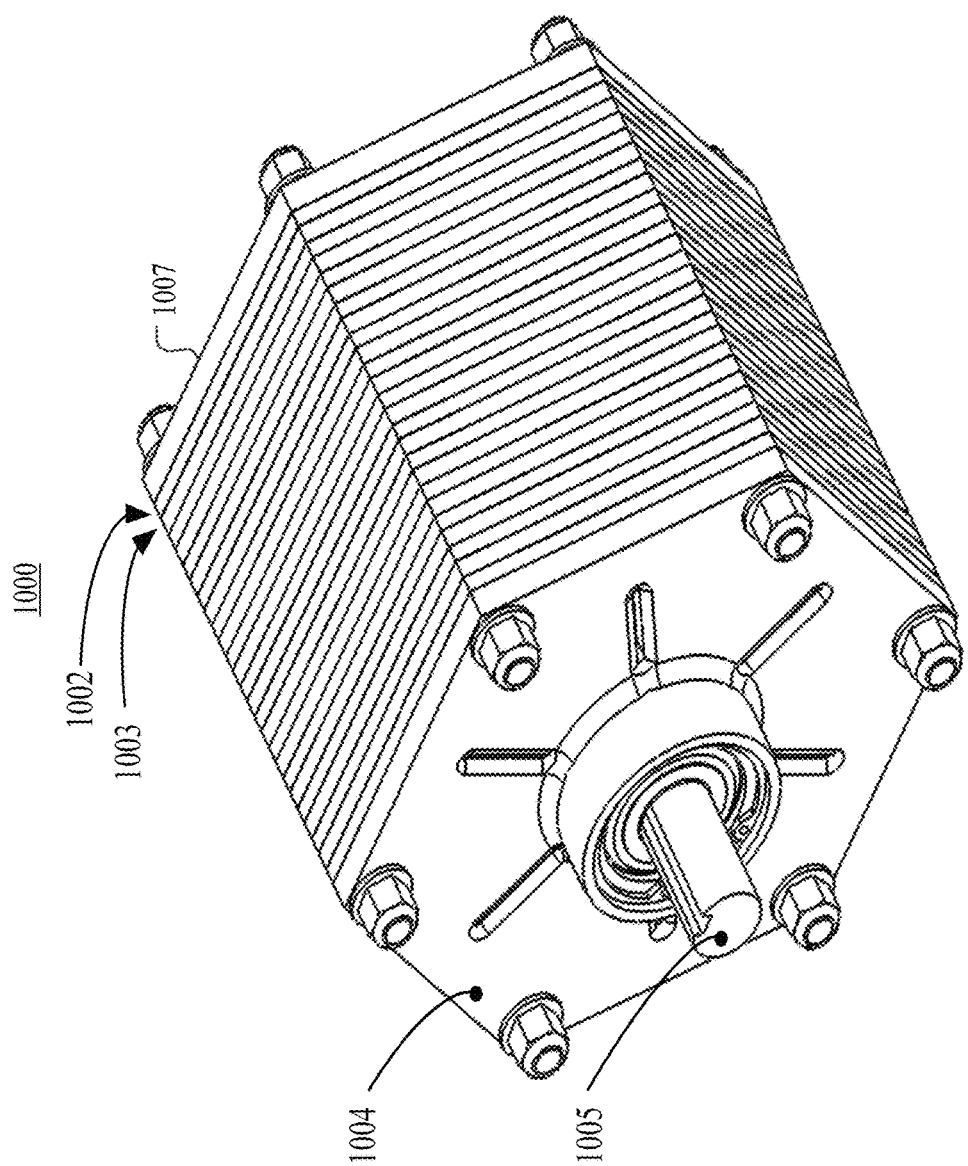
FIG. 10 illustrates a perspective view of one embodiment of an electrostatic machine in accordance with various aspects as set forth herein.

FIG. 10 illustrates a perspective view of one embodiment of an electrostatic machine 1000 in accordance with various aspects as set forth herein. In FIG. 10, the electrostatic machine 1000 may be configured to include a plurality of stator member assemblies 1002, a plurality of stator spacer members 1003, a front encapsulation member 1004, a shaft member 1005, and a back encapsulation member 1007. Further, the electrostatic machine 1000 may be configured to have successive layers of one of the plurality of stator member assemblies 1002 and one of the plurality of stator spacer members 1003 between the front encapsulation member 1004 and the back encapsulation member 1007. In addition, the shaft member 1005 may be positioned in an inner cylindrical volume formed by the plurality of stator member assemblies 1002.

Figure 11:
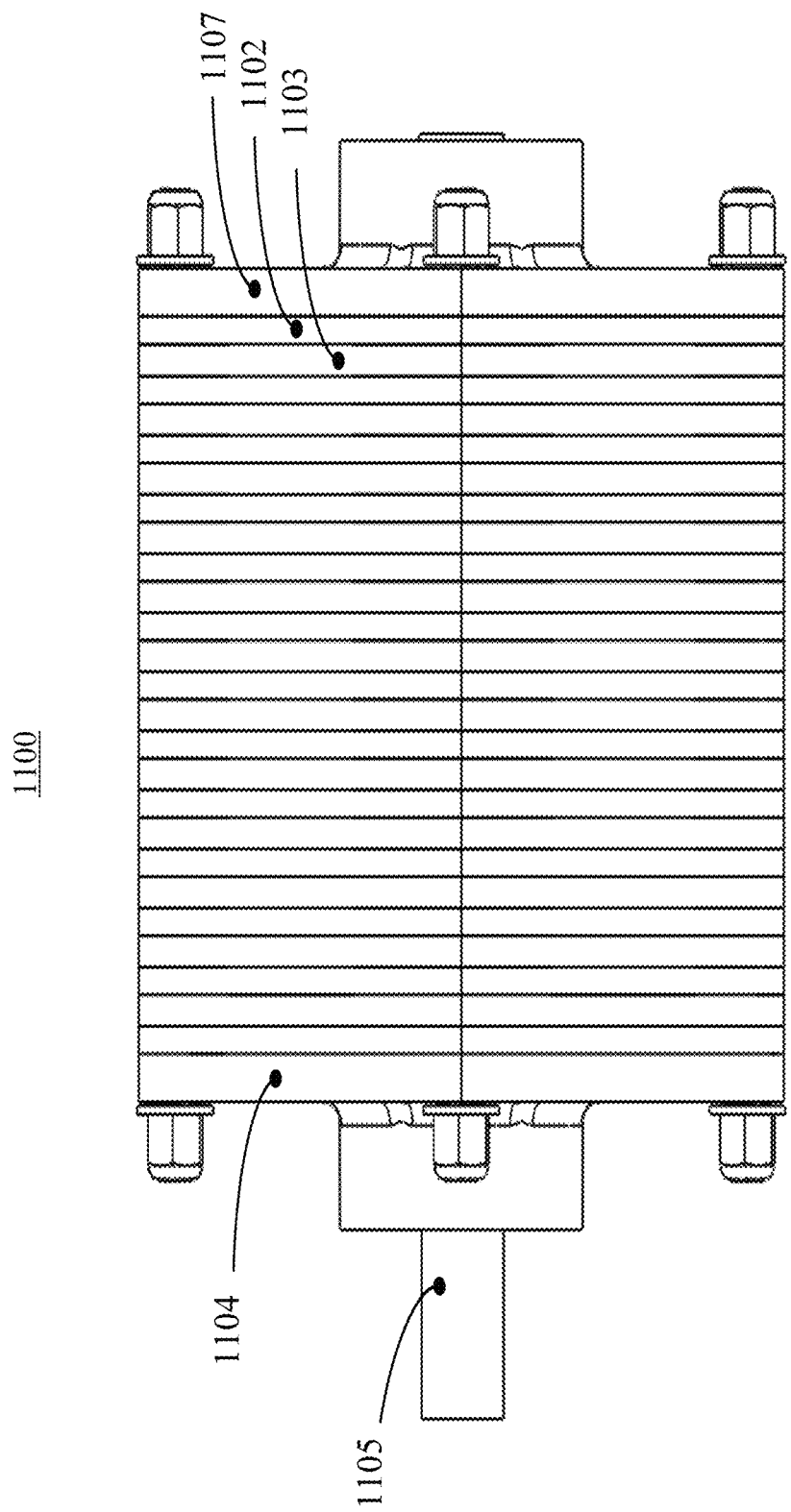
FIG. 11 illustrates a side view of another embodiment of an electrostatic machine in accordance with various aspects as set forth herein.

FIG. 11 illustrates a side view of another embodiment of an electrostatic machine 1100 in accordance with various aspects as set forth herein. In FIG. 11, the electrostatic machine 1100 may be configured to include a plurality of stator member assemblies 1102, a plurality of stator spacer members 1103, a front encapsulation member 1104, a shaft member 1105, and a back encapsulation member 1107. Further, the electrostatic machine 1100 may be configured to have successive layers of one of the plurality of stator member assemblies 1102 and one of the plurality of stator spacer members 1103 between the front encapsulation member 1104 and the back encapsulation member 1107. The shaft member 1105 may be positioned in an inner cylindrical volume formed by the plurality of stator member assemblies 1102.

Figure 12:
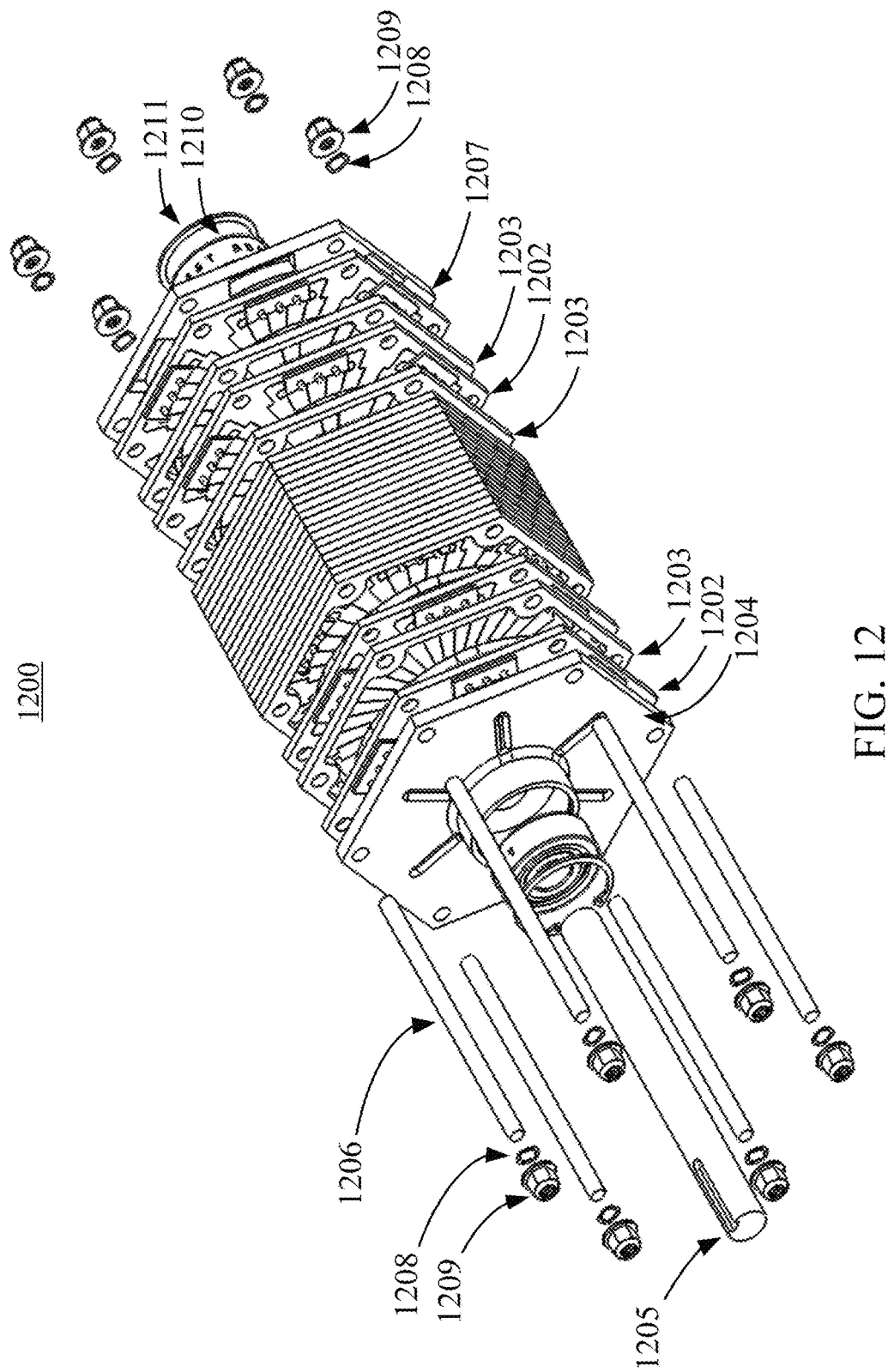
FIG. 12 illustrates an exploded perspective view of another embodiment of an electrostatic machine in accordance with various aspects as set forth herein.

FIG. 12 illustrates an exploded perspective view of another embodiment of an electrostatic machine 1200 in accordance with various aspects as set forth herein. In FIG. 12, the electrostatic machine 1200 may be configured to include a plurality of stator member assemblies 1202, a plurality of stator spacer members 1203, a front encapsulation member 1204, a shaft member 1205, a plurality of alignment rods 1206, a back encapsulation member 1207, a plurality of washers 1208, a plurality of tensioning mechanisms 1209, a plurality of bearings 1210, and a securing ring 1211. Further, the electrostatic machine 1200 may be configured to have successive layers of one of the plurality of stator member assemblies 1202 and one of the plurality of stator spacer members 1203 between the front encapsulation member 1204 and the back encapsulation member 1207. Further, the electrostatic machine 1200 may be configured to have a rotor assembly composed of a rotor members and the shaft member 1205, which may be positioned in an inner cylindrical volume formed by the plurality of stator member assemblies 1202. The plurality of bearings 1210 may be held by the securing ring 1211 to support the shaft member 1205. The plurality of alignment rods 1206 may be used to position the plurality of stator member assemblies 1202 and the plurality of stator spacer members 1203. One of the plurality of washers 1208 and one of the plurality of tensioning mechanisms 1209 may be applied to one or both ends of one of the plurality of alignment rods 1206 to secure the one of the plurality of alignment rods 1206 to the electrostatic machine 1200. In one example, one of the plurality of tensioning mechanisms 1209 may be a fastener such as a nut. In another embodiment, one of the plurality of tensioning mechanisms 1209 may be applied to one or both ends of one of the plurality of alignment rods 1206 to secure the one of the plurality of alignment rods 1206 to the electrostatic machine 1200.

Figure 13:
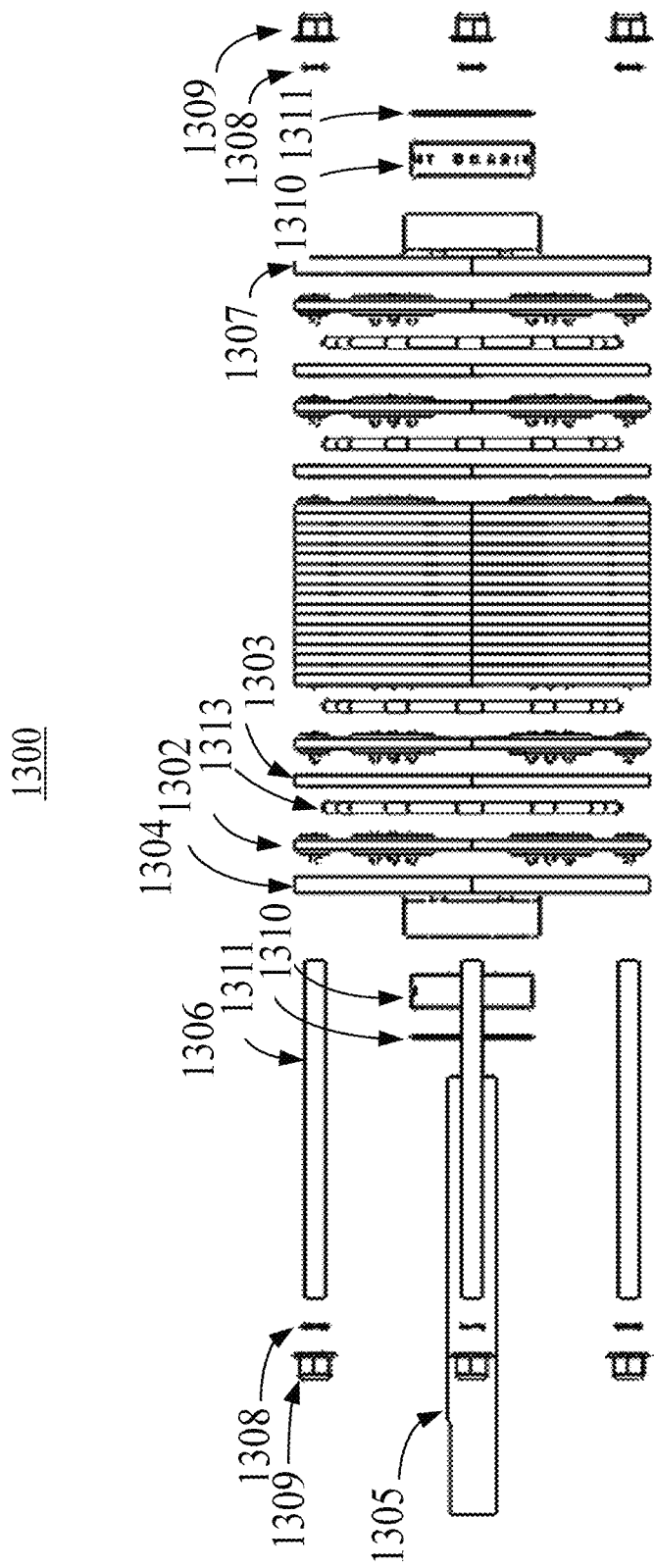
FIG. 13 illustrates an exploded side view of another embodiment of an electrostatic machine in accordance with various aspects as set forth herein.

FIG. 13 illustrates an exploded side view of another embodiment of an electrostatic machine 1300 in accordance with various aspects as set forth herein. In FIG. 13, the electrostatic machine 1300 may be configured to include a plurality of stator member assemblies 1302, a plurality of stator spacer members 1303, a front encapsulation member 1304, a shaft member 1305, a plurality of alignment rods 1306, a back encapsulation member 1307, a plurality of washers 1308, a plurality of tensioning mechanisms 1309, a plurality of bearings 1310, a plurality of securing rings 1311, and a plurality of rotor members 1313. Further, the electrostatic machine 1300 may be configured to have successive layers of one of the plurality of stator member assemblies 1302 and one of the plurality of stator spacer members 1303 between the front encapsulation member 1304 and the back encapsulation member 1307 and a rotor assembly. The rotor assembly may be composed of a plurality of rotor members 1313 and shaft member 1305, which may be positioned in an inner cylindrical volume formed by the plurality of stator member assemblies 1302. The plurality of bearings 1310 may be held by the securing ring 1313 to support the shaft member 1305. The plurality of alignment rods 1306 may be used to position the plurality of stator member assemblies 1302 and the plurality of stator spacer members 1303. One of the plurality of washers 1308 and one of the plurality of tensioning mechanisms 1309 may be applied to one or both ends of one of the plurality of alignment rods 1306 to secure the one of the plurality of alignment rods 1306 to the electrostatic machine 1300. In one example, one of the plurality of tensioning mechanisms 1309 may be a fastener such as a nut. In another embodiment, one of the plurality of tensioning mechanisms 1309 may be applied to one or both ends of one of the plurality of alignment rods 1306 to secure the one of the plurality of alignment rods 1306 to the electrostatic machine 1300. Each of the plurality of rotor members 1313 may be positioned in a volume formed between two of the plurality of stator members 1302 that are separated by one of the plurality of stator spacer members 1303.

Figure 14:
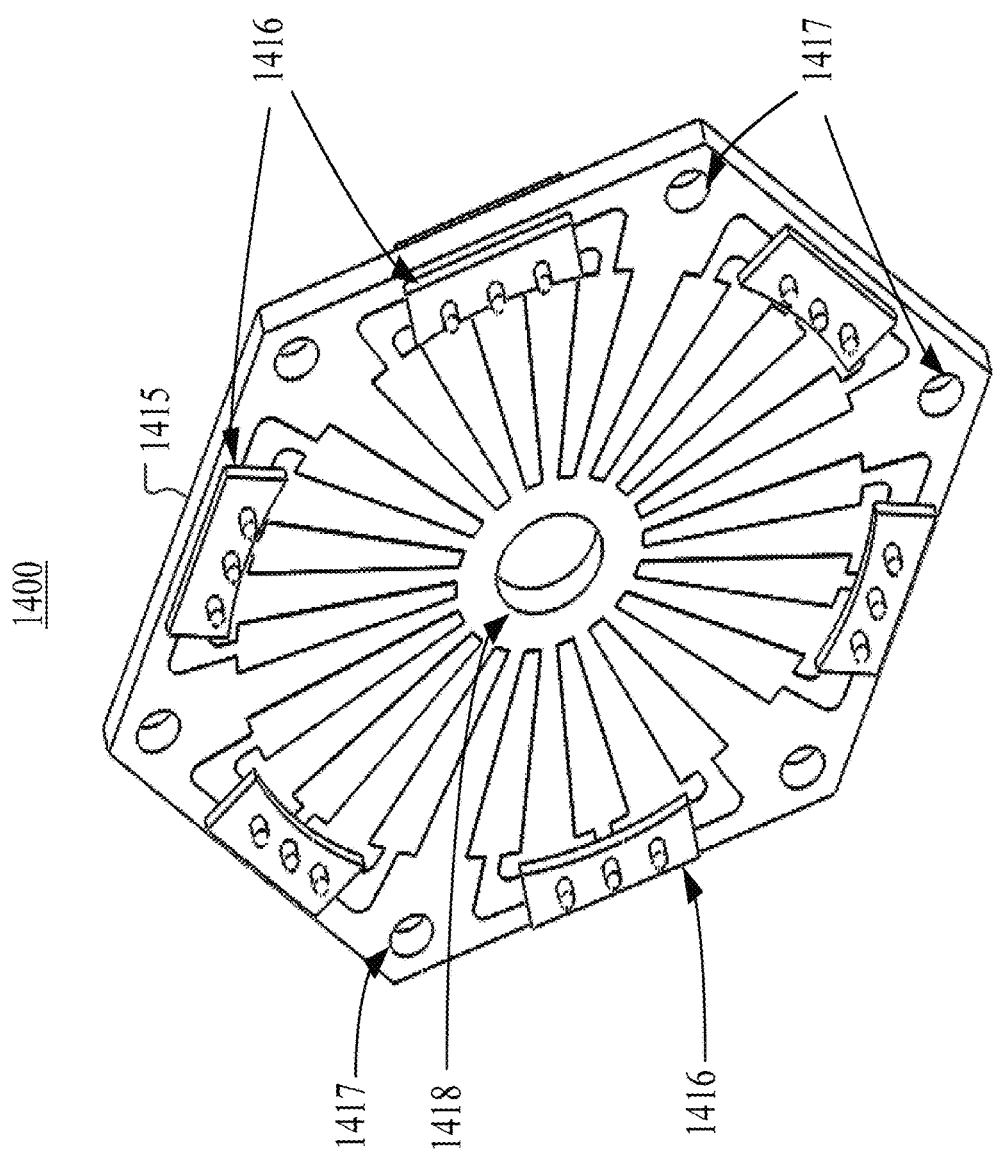
FIG. 14 illustrates a perspective view of one embodiment of a stator member assembly in accordance with various aspects as set forth herein.

FIG. 14 illustrates a perspective view of one embodiment of a stator member assembly 1400 in accordance with various aspects as set forth herein. In FIG. 14, the stator member assembly 1400 may be configured to include a stator member 1415, a plurality of stator modular connector assemblies 1416, a plurality of alignment rod securing mechanisms 1417, and a shaft cutout 1418. Each of the plurality of alignment rod securing mechanisms 1417 may be a through hole in the stator member 1415 used to allow each of a plurality of alignment rods to align the stator member assembly 1400 with other stator member assemblies. In another embodiment, each of the plurality of alignment rod securing mechanisms 1417 may be used to align and secure the stator member assembly 1400. The shaft cutout 1418 may be a through hole in the stator member 1415 used to allow a shaft member to be freely positioned within the stator member assembly 1400.

Figure 15:
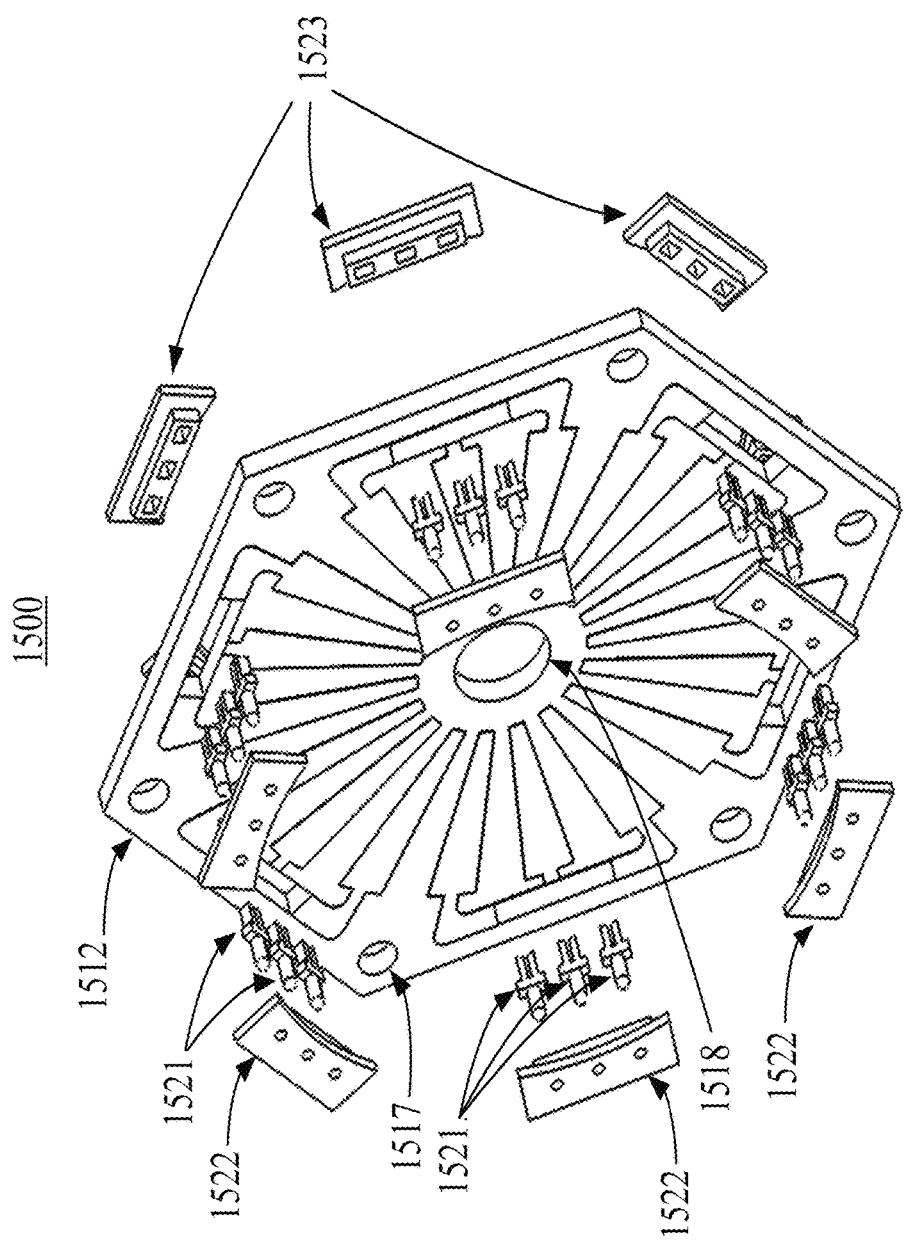
FIG. 15 illustrates an exploded perspective view of one embodiment of a stator member assembly in accordance with various aspects as set forth herein.

FIG. 15 illustrates an exploded perspective view of one embodiment of a stator member assembly 1500 in accordance with various aspects as set forth herein. In FIG. 15, the stator member assembly 1500 may be configured to include a stator member 1515, a plurality of stator modular connector assemblies, a plurality of alignment rod securing mechanisms 1517, and a stator shaft cutout 1518. Each of the plurality of alignment rod securing mechanisms 1517 may be a through hole in the stator member 1515 used to allow each of a plurality of alignment rods to align the stator member assembly 1500 with a spacer member and another stator member assembly. In another embodiment, each of the plurality of alignment rod securing mechanisms 1517 may be used to align and secure the stator member assembly 1500. The stator shaft cutout 1518 may be a through hole in the stator member 1515 used to allow a shaft member to be freely positioned within the stator member assembly 1500. Each of the plurality of stator modular connector assemblies may be configured to include a stator connector 1521, a stator modular connector front housing 1522, and a stator modular connector back housing 1523. Each of the stator connectors 1521 may be used to couple one of a plurality of stator poles to one of a plurality of voltage phases of a voltage source. In one example, the stator connector 1521 may be a plug or a receptacle.

Figure 16:
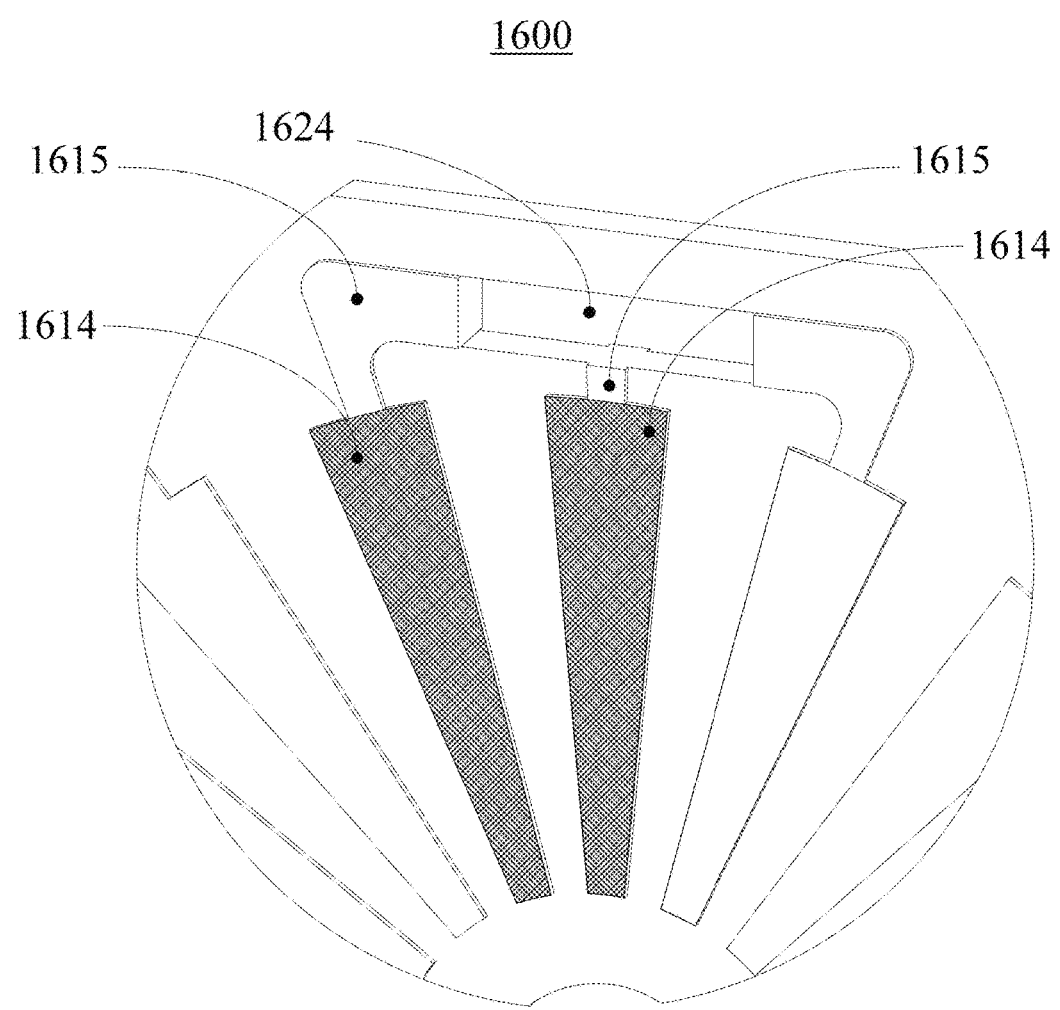
FIG. 16 illustrates a perspective view of a portion of one embodiment of a stator member in accordance with various aspects as set forth herein.

FIG. 16 illustrates a perspective view of a portion of one embodiment of a stator member 1600 in accordance with various aspects as set forth herein. In FIG. 16, the stator member 1600 may be configured to include a plurality of stator poles 1614, a plurality of interconnects 1615, and a slot for a stator modular connector assembly 1624. Each of the plurality of stator poles 1614 may be coupled to the slot for the stator modular connector assembly 1624 using one of the plurality of interconnects 1615. Each of the plurality of stator poles 1614 may be associated with one of a plurality of voltage phases of a voltage source. In FIG. 16, item 1614 is an electrically conductive stator petal 1614 that resides on an electrically insulating substrate 1515. Petals 1614 on a stator member may or may not illustrate the same pole or phase. Petal connector 1615 electrically connects the petal 1614 to an electrical connection location 1624 for an electrical connector to connect to a phase voltage and voltage source. A stator modular connector assembly 2000 may be used to improve assembly features of the electrostatic machine 1000.

Figure 17:
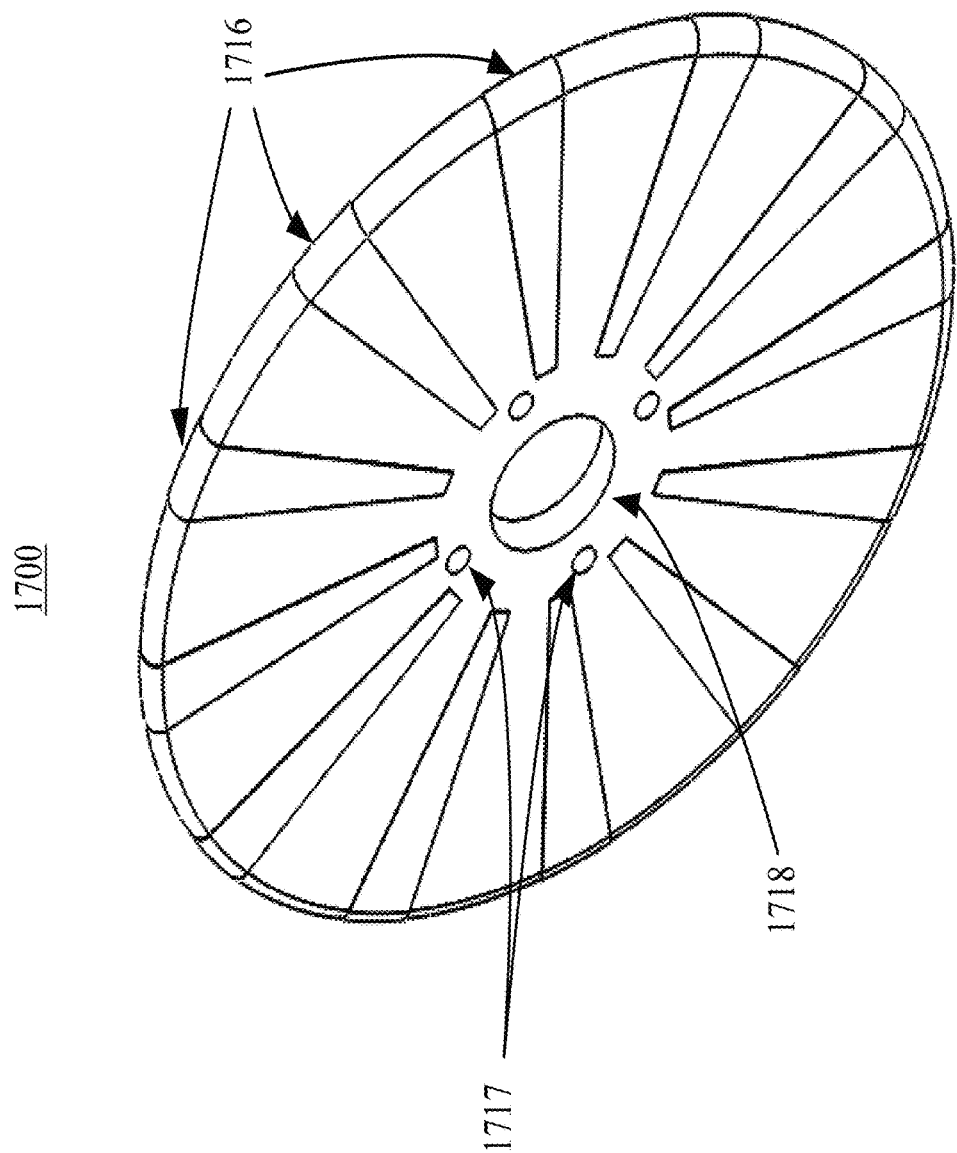
FIG. 17 illustrates a perspective view of one embodiment of a rotor member in accordance with various aspects as set forth herein.

FIG. 17 illustrates a perspective view of an embodiment of a rotor member 1700 in accordance with various aspects as set forth herein. In FIG. 17, the rotor member 1700 may be configured to include a plurality of rotor poles 1716, a plurality of rotor securing mechanisms 1717, and a rotor shaft cutout 1718. Each of the plurality of rotor poles 1716 may be electrically isolated from each other. Each of the plurality of rotor poles 1716 may be on both a front portion and a back portion of the rotor member 1700. Further, each of the plurality of rotor poles 1716 may couple its front portion and its back portion by, for instance, using a conductive plated through hole in the rotor member 1700 or wrapping the conductive layer of the rotor pole around the edge of the rotor member 1700 to connect the front portion and the back portion of the rotor pole. The plurality of rotor securing mechanisms 1717 may be used to secure the rotor member 1700 to a shaft member. The rotor shaft cutout 1718 may be a through hole in the rotor member 1700 used to allow a shaft member to be freely positioned within the rotor member 1700. In FIG. 17, item 1716 is an electrically conductive rotor petal that resides on an electrically insulating substrate 1715. Petals may have surfaces on the front and back of the rotor member 1700 but may be electrically isolated from other petals. The rotor member 1700 may have profiling 1717 and 1718 to permit connection to the motor shaft.

Figure 18:
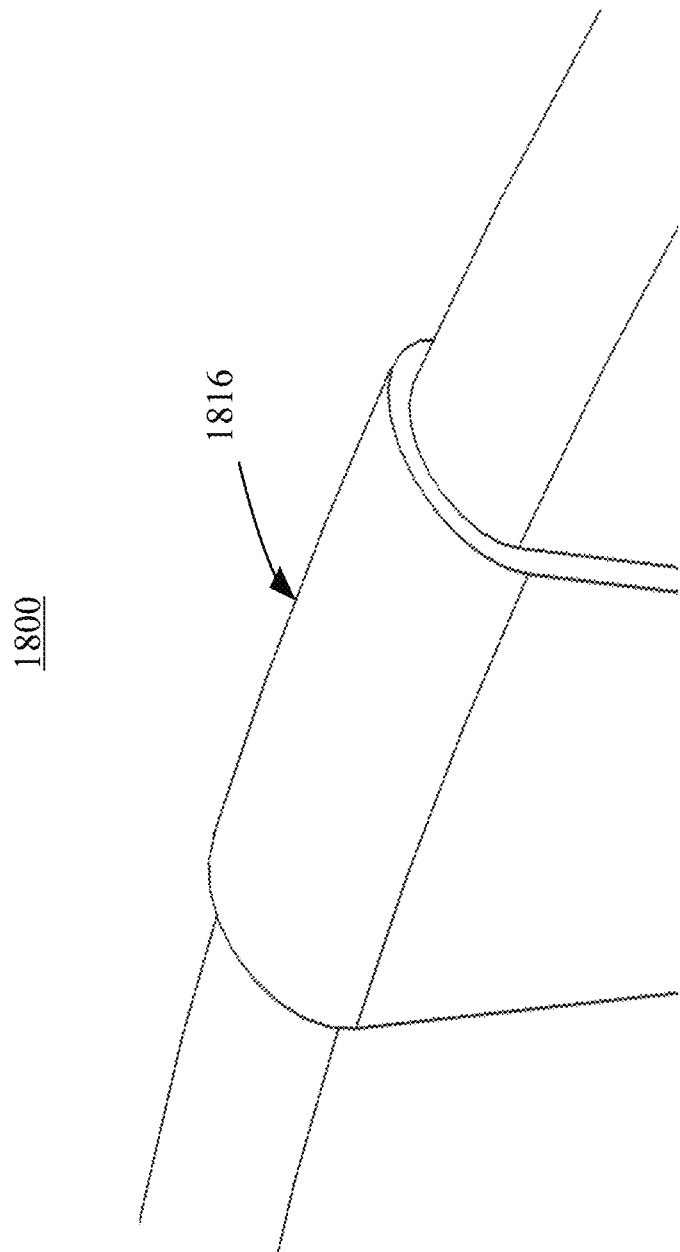
FIG. 18 illustrates a perspective view of a portion of one embodiment of a rotor member in accordance with various aspects as set forth herein.

FIG. 18 illustrates a perspective view of a portion of one embodiment of a rotor member 1800 where rotor petal 1816 electrically connects from the front to the back surface of the rotor member in accordance with various aspects as set forth herein. In FIG. 18, a front portion and a back portion of a rotor petal 1816 may be coupled by wrapping the conductive layer of the rotor petal 1816 around the edge of the rotor member 1800. In another embodiment, the rotor petal 1816 may electrically connect to the front and back surfaces using conductively filled holes between the two surfaces.

Figure 19:
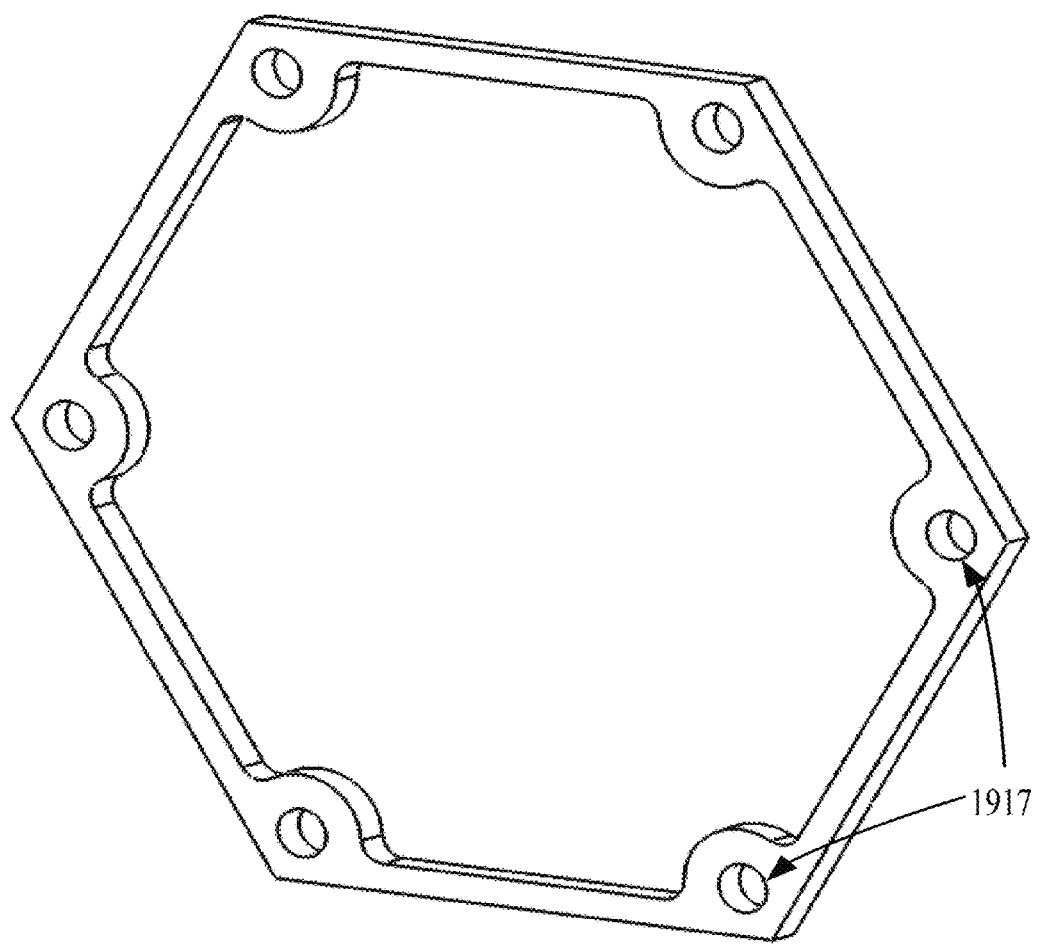
FIG. 19 illustrates a perspective view of one embodiment of a spacer member in accordance with various aspects as set forth herein.

FIG. 19 illustrates a perspective view of one embodiment of a spacer member 1900 in accordance with various aspects as set forth herein. In FIG. 19, each of the plurality of alignment rod securing mechanisms 1917 may be a through hole in the spacer member 1900 used to allow each of a plurality of alignment rods to align the spacer member 1900 with a plurality of stator member assemblies and other spacer members. In another embodiment, each of the plurality of alignment rod securing mechanisms 1917 may be used to align and secure the spacer member 1900. In FIG. 19, item 1917 show alignment holes to improve assembly features of the electrostatic machine.

Figure 20:
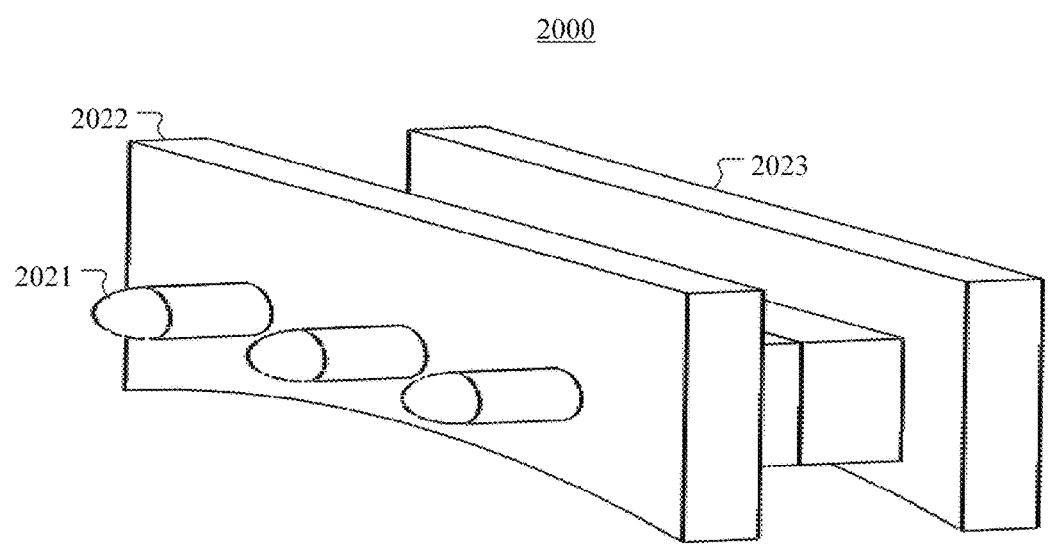
FIG. 20 illustrates a perspective view of one embodiment of a stator modular connector assembly in accordance with various aspects as set forth herein.

FIG. 20 illustrates a perspective view of one embodiment of a stator modular connector assembly 2000 in accordance with various aspects as set forth herein. In FIG. 20, the stator modular connector assembly 2000 may be configured to include a stator connector 2021, a stator modular connector front housing 2022, and a stator modular connector back housing 2023. Each of the stator connectors 2021 may be used to couple one of a plurality of stator poles to one of a plurality of voltage phases of a voltage source. In one example, the stator connector 2021 may be a receptacle or a plug.

Figure 21:
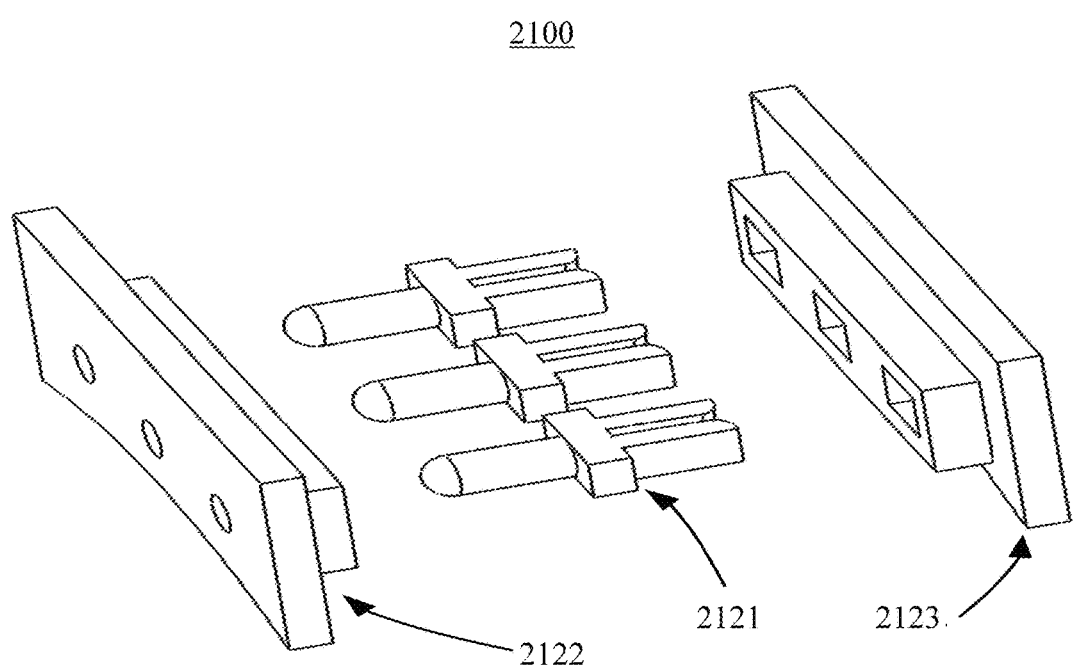
FIG. 21 illustrates an exploded perspective view of another embodiment of a stator modular connector assembly in accordance with various aspects as set forth herein.

FIG. 21 illustrates an exploded perspective view of another embodiment of a stator modular connector assembly 2100 in accordance with various aspects as set forth herein. In FIG. 21, the stator modular connector assembly 2100 may be configured to include a stator connector 2121, a stator modular connector front housing 2122, and a stator modular connector back housing 2123. Each of the stator connectors 2121 may be used to couple one of a plurality of stator poles to one of a plurality of voltage phases of a voltage source. The stator modular connector assembly 2000 may be composed of a front plate 2122, a back plate 2123 and hermaphroditic electrical connector pin 2121. The stator connector 2121 may be a receptacle or a plug.

Figure 22A:
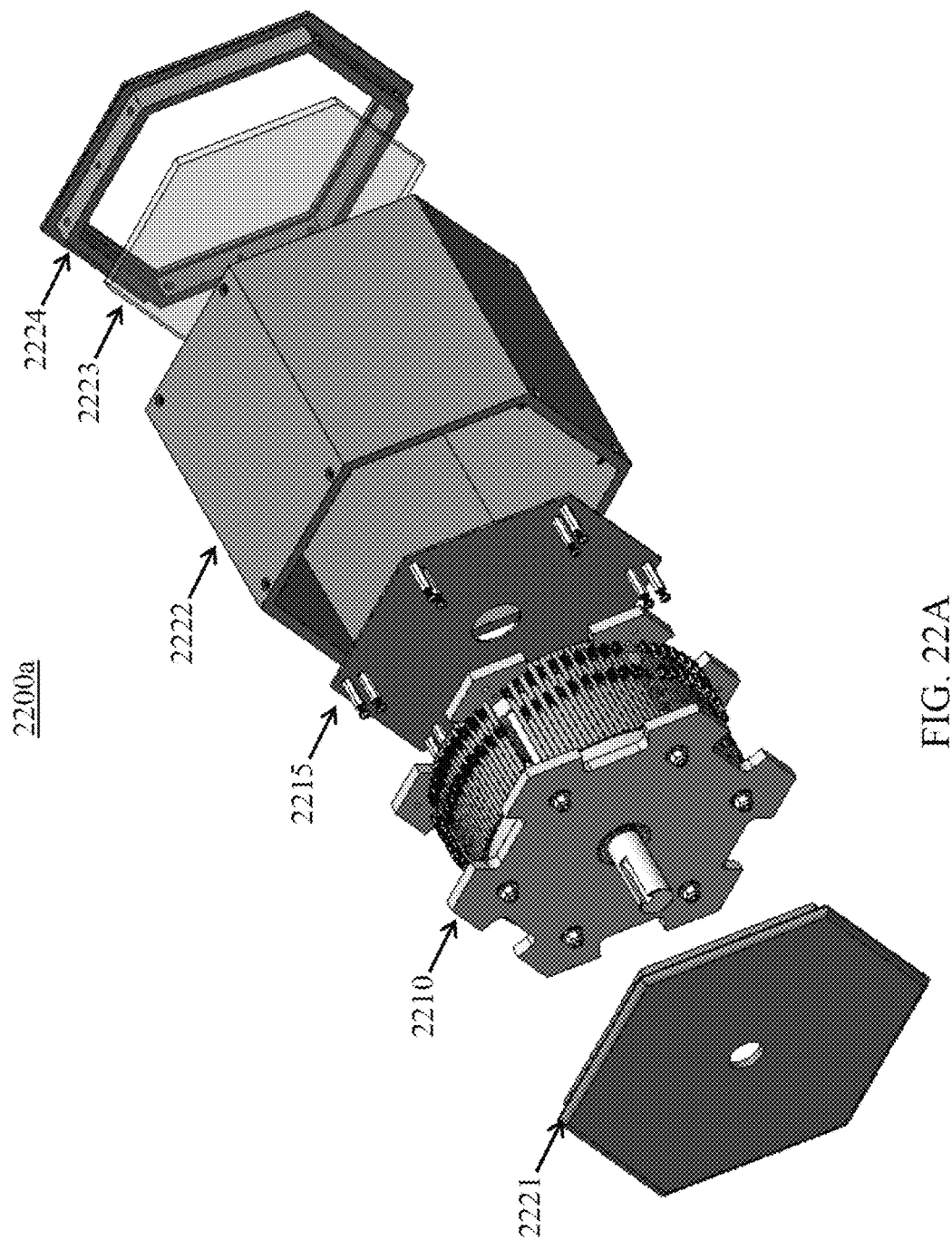
FIG. 22A illustrates an exploded perspective view of another embodiment of an electrostatic machine in accordance with various aspects as set forth herein.

FIG. 22A illustrates an exploded perspective view of another embodiment of an electrostatic machine 2200a in accordance with various aspects as set forth herein. In FIG. 22A the electrostatic machine is composed of a housing with a front plate 2221, a back plate 2224, a back plate window 2223, a housing cover 2222, a motor drive 2215 and an electrostatic motor 2210. The motor drive may include a control printed circuit board.

Figure 22B:
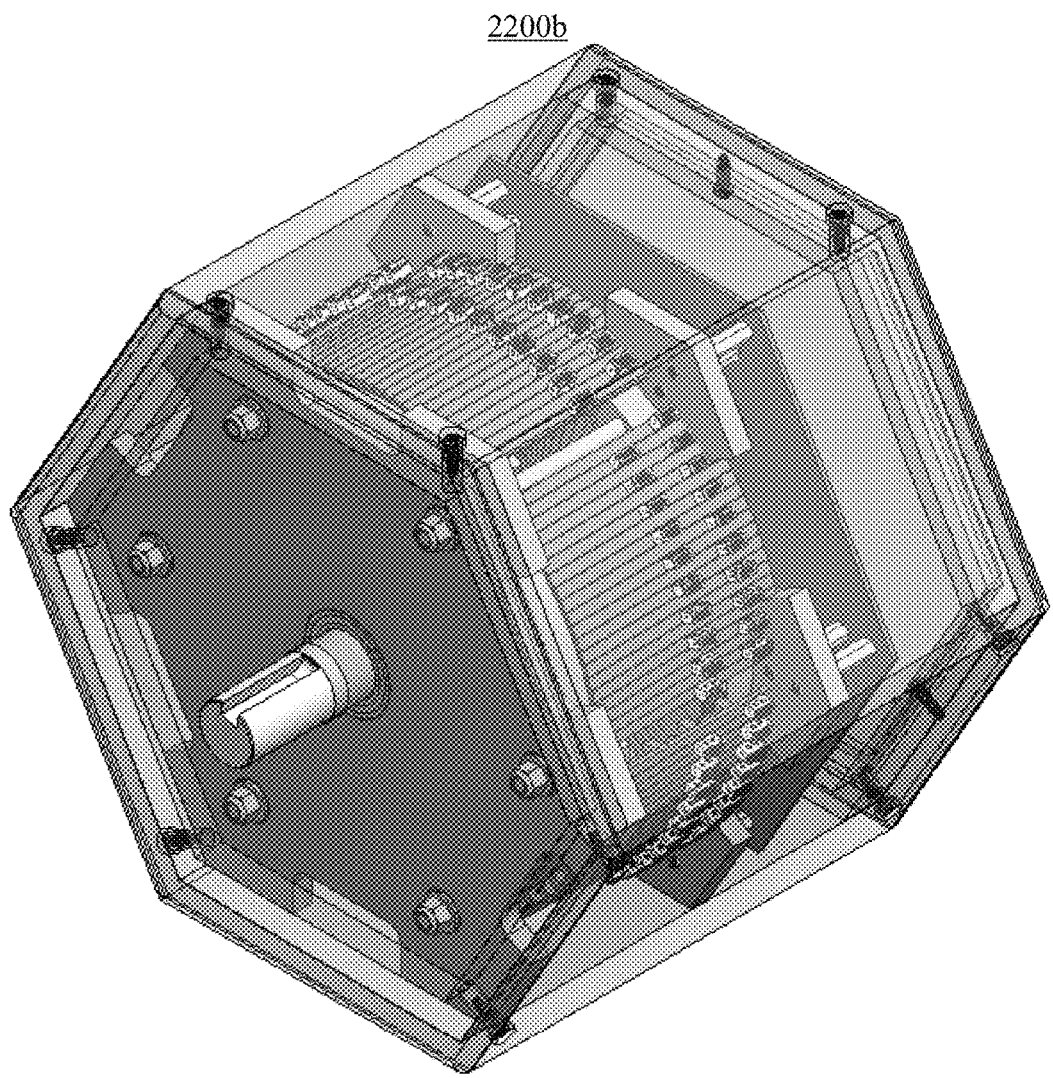
FIG. 22B illustrates a perspective view of another embodiment of an electrostatic machine in accordance with various aspects as set forth herein.

FIG. 22B illustrates a perspective view of another embodiment of an electrostatic machine 2200b with a housing, an electrostatic motor and a motor drive in accordance with various aspects as set forth herein.

Figure 22C:
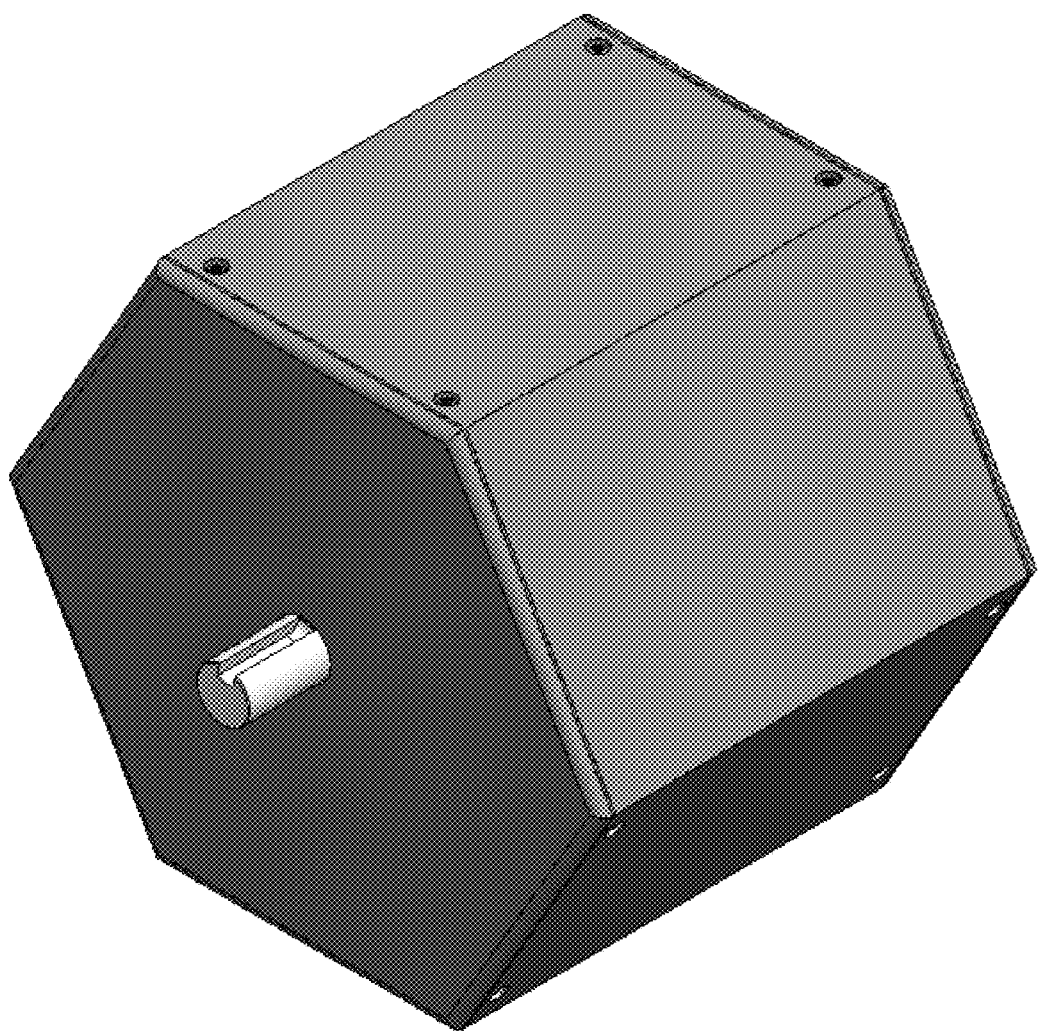
FIG. 22C illustrates a perspective view of another embodiment of an electrostatic machine in accordance with various aspects as set forth herein.

FIG. 22C illustrates a perspective view of another embodiment of an electrostatic machine 2200c with a housing, an electrostatic motor and a motor drive in accordance with various aspects as set forth herein.

Figure 23:
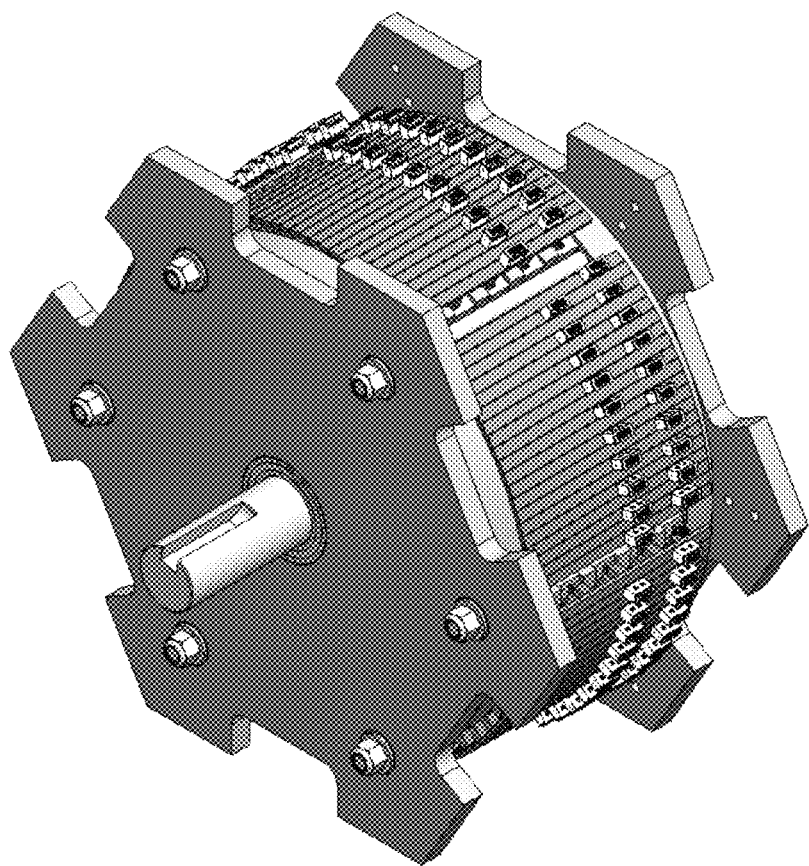
FIG. 23 illustrates a perspective view of another embodiment of an electrostatic machine in accordance with various aspects as set forth herein.

FIG. 23 illustrates a perspective view of another embodiment of an electrostatic machine 2300 in accordance with various aspects as set forth herein.

Figure 24:
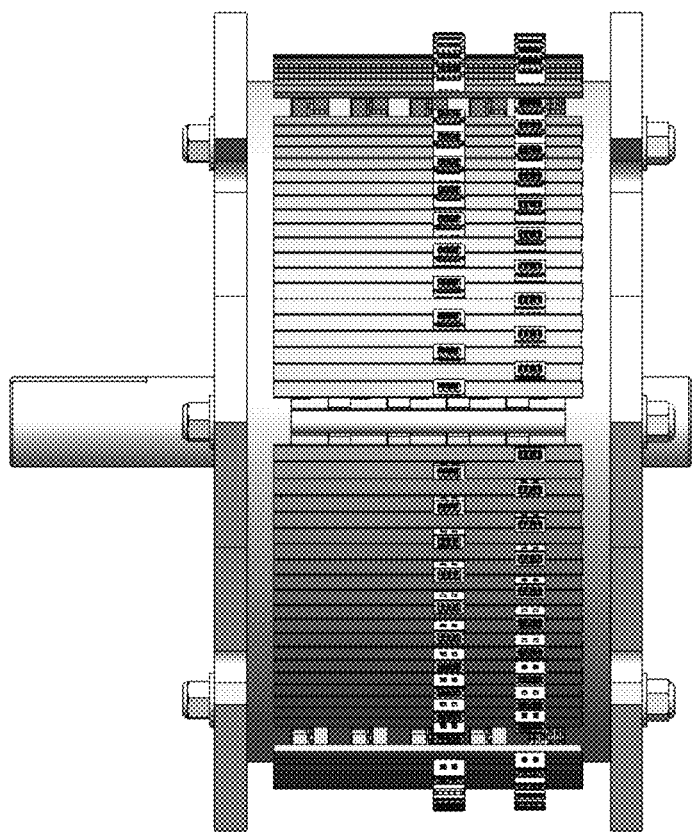
FIG. 24 illustrates a side view of another embodiment of an electrostatic machine in accordance with various aspects as set forth herein.

FIG. 24 illustrates a side view of another embodiment of an electrostatic machine 2400 in accordance with various aspects as set forth herein.

Figure 25:
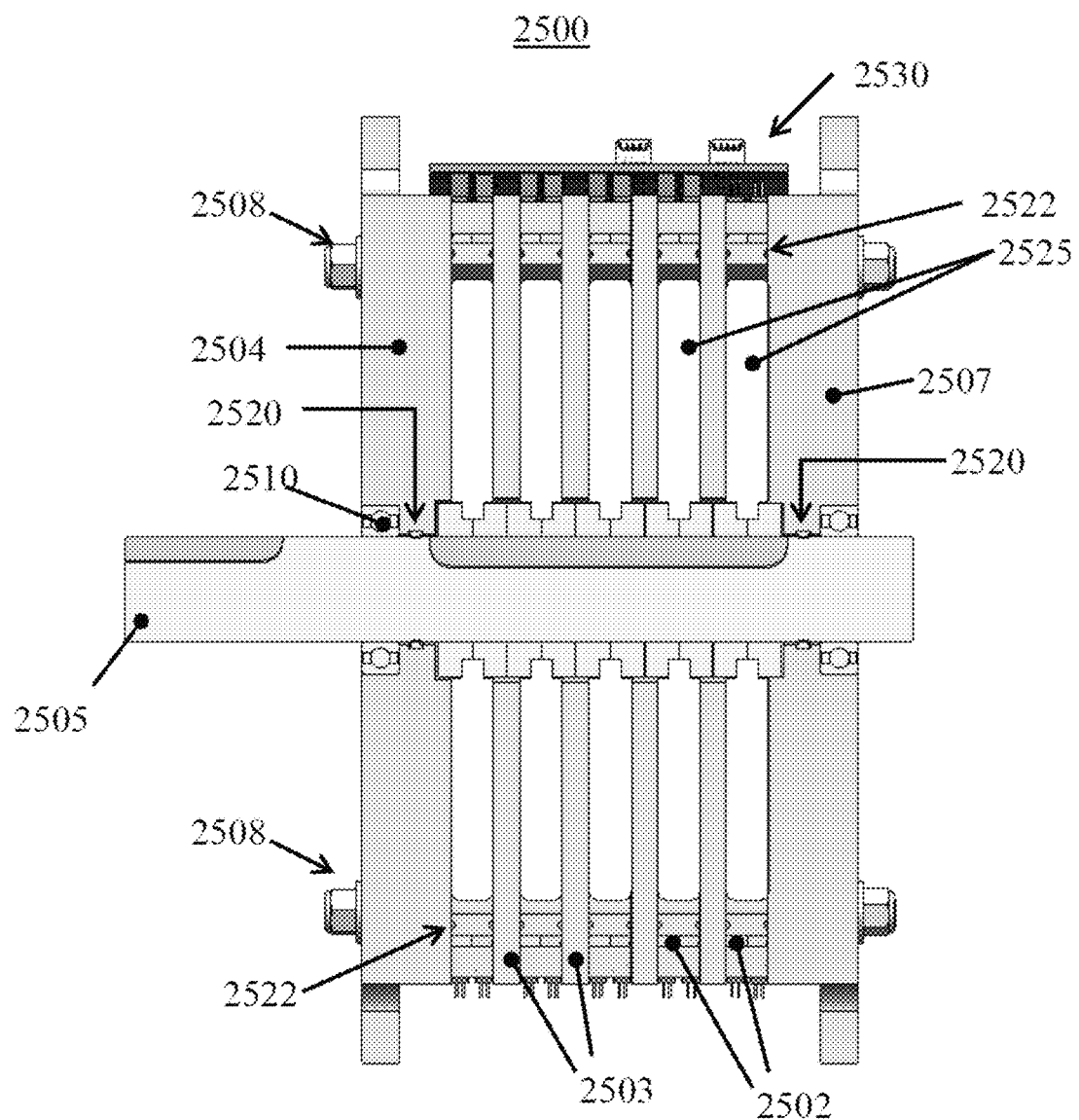
FIG. 25 illustrates a side view of one embodiment of a motor drive in accordance with various aspects as set forth herein.

FIG. 25 illustrates a side cutout view of one embodiment of an electrostatic motor 2500 in accordance with various aspects as set forth herein. In FIG. 25, the electrostatic motor 2500 may be configured to include a front encapsulation member 2504, a back encapsulation member 2507, a shaft member 2505, a bearing 2510, a plurality of seal rings 2520 and 2522, a plurality of tensioning mechanism 2508, a plurality of stator member assemblies 2502, a plurality of rotor member assemblies 2525, a plurality of spacer members 2503 and a plurality of electrical printed circuit board members 2530.

Figure 26:
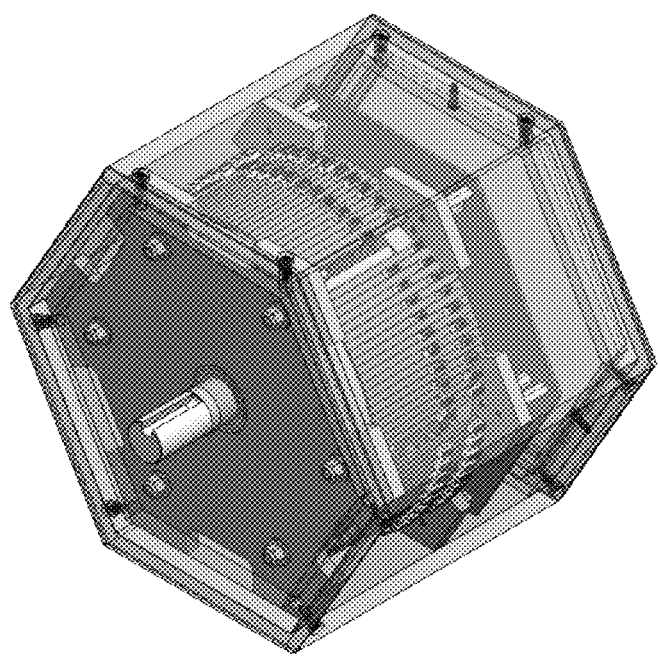
FIG. 26 illustrates a perspective view of another embodiment of an electrostatic machine in accordance with various aspects as set forth herein.

FIG. 26 illustrates a perspective view of another embodiment of an electrostatic machine 2600 in accordance with various aspects as set forth herein.

Figure 27:
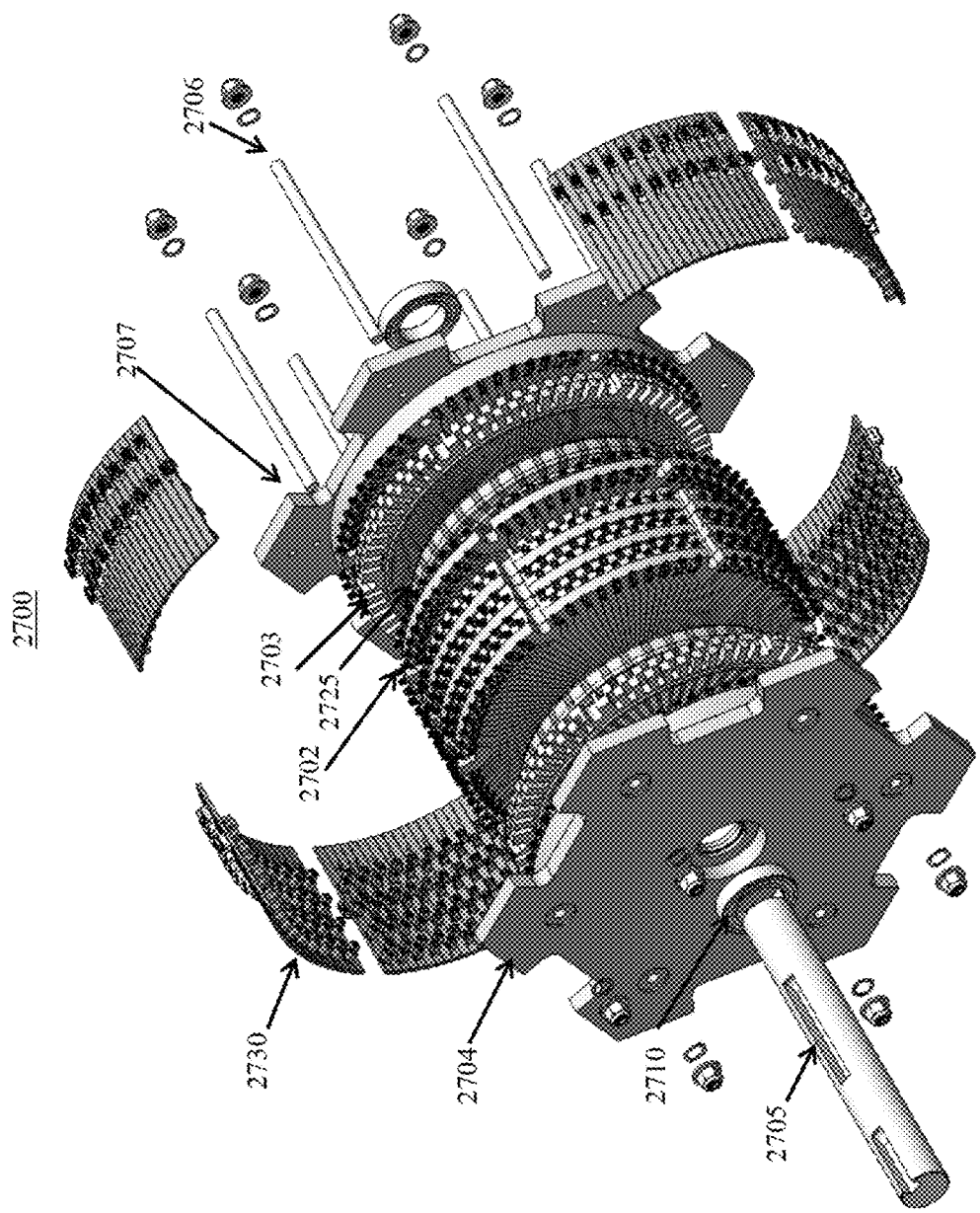
FIG. 27 illustrates an exploded perspective view of another embodiment of an electrostatic machine in accordance with various aspects as set forth herein.

FIG. 27 illustrates an exploded perspective view of another embodiment of an electrostatic machine 2700 in accordance with various aspects as set forth herein. In FIG. 27, the electrostatic machine 2700 may be configured to include a front encapsulation member 2704, a back encapsulation member 2707, a shaft member 2705, a plurality of tensioning mechanisms 2708, a plurality of stator member assemblies 2702, a plurality of rotor assemblies 2725, a plurality of spacer members 2703 and a plurality of stator connector assemblies 2730. The plurality of stator connector assemblies 2730 may be at least one electrical printed circuit board members having at least one stator connector.

Figure 28:
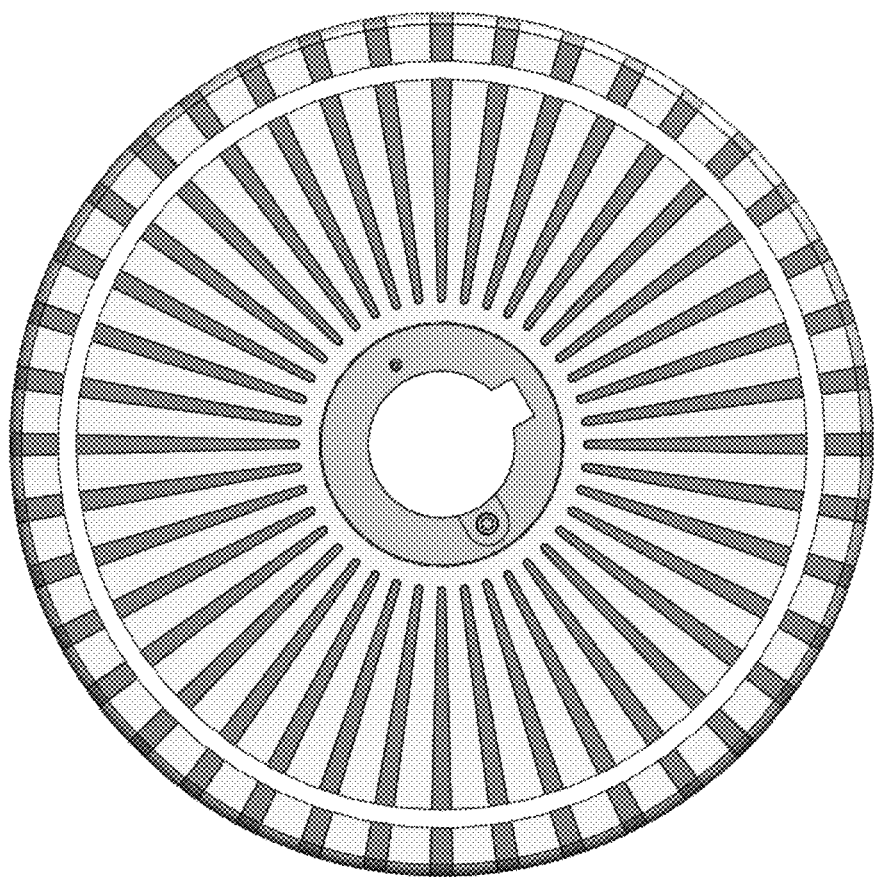
FIG. 28 illustrates a perspective view of one embodiment of a rotor member assembly in accordance with various aspects as set forth herein.

FIG. 28 illustrates a perspective view of one embodiment of a rotor member assembly 2800 in accordance with various aspects as set forth herein.

Figure 29:
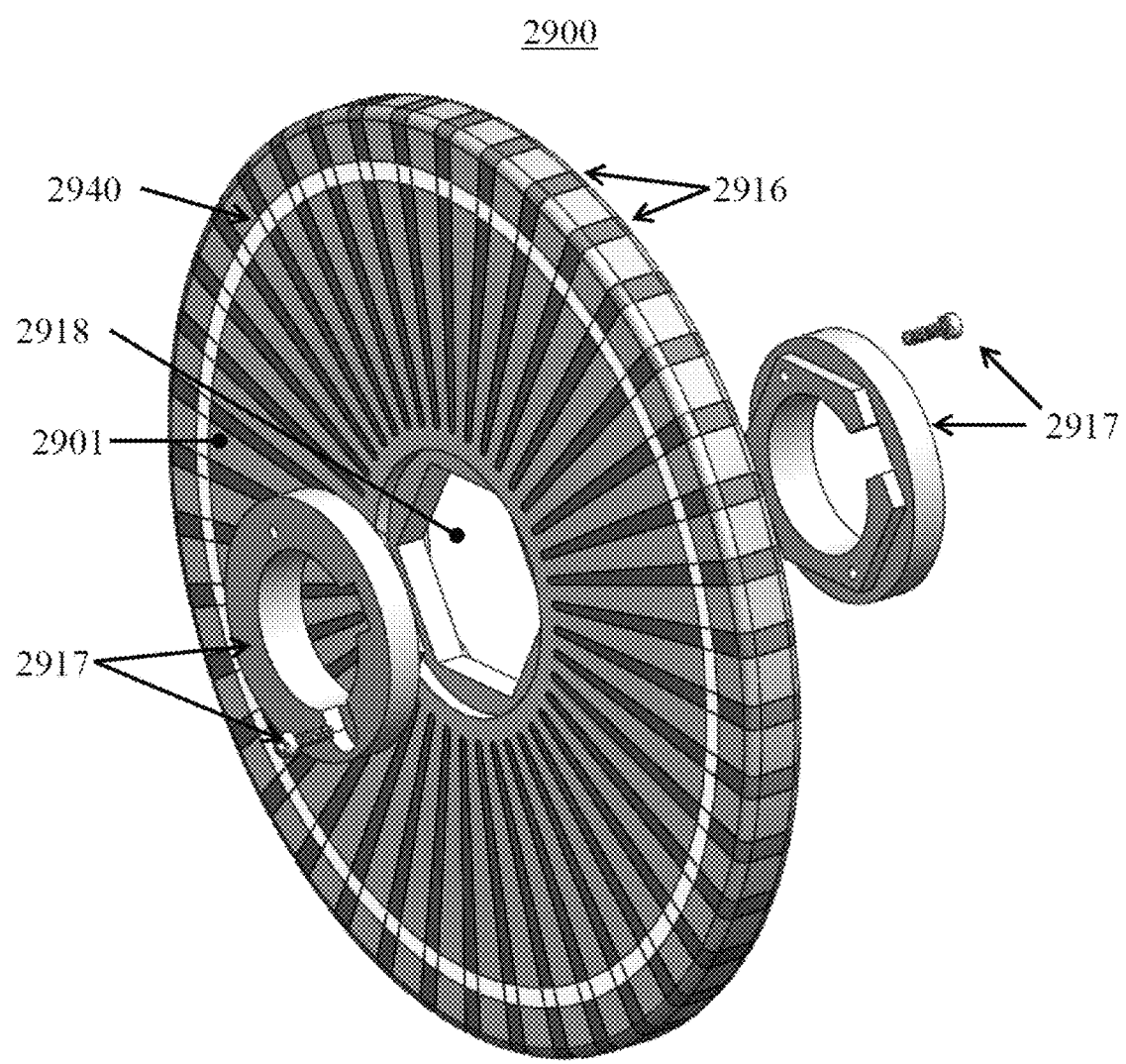
FIG. 29 illustrates an exploded perspective view of another embodiment of a rotor member assembly in accordance with various aspects as set forth herein.

FIG. 29 illustrates an exploded perspective view of another embodiment of a rotor member assembly 2900 in accordance with various aspects as set forth herein. In FIG. 29, the rotor member assembly 2900 may be configured to include a rotor member 2901 with a plurality of rotor poles 2916, a plurality of rotor securing mechanisms 2917, a rotor shaft cutout 2918 and an anti-vibration coating ring 2940.

Figure 30:
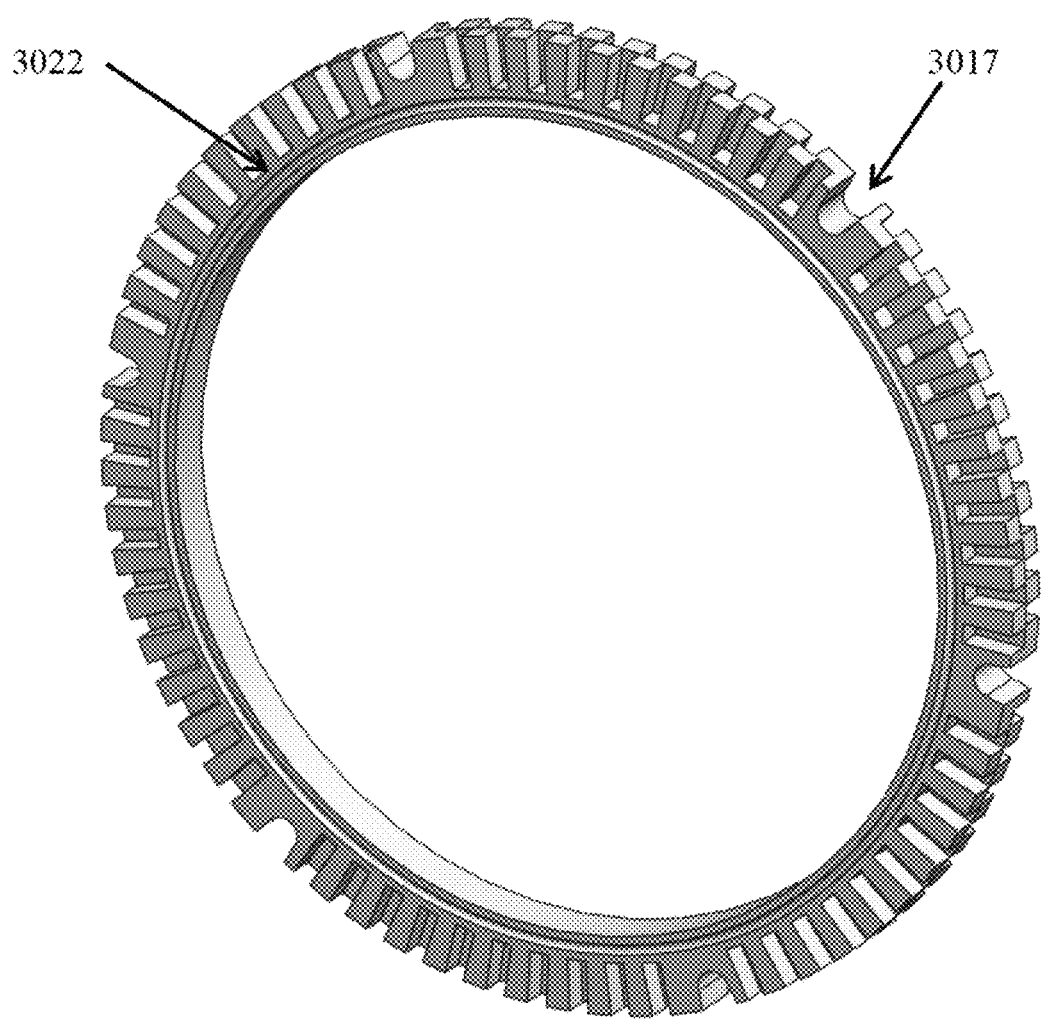
FIG. 30 illustrates a perspective view of one embodiment of a spacer member in accordance with various aspects as set forth herein.

FIG. 30 illustrates a perspective view of one embodiment of a spacer member 3000 in accordance with various aspects as set forth herein. In FIG. 30, the spacer member 3000 may be configured to include a plurality of alignment rod securing mechanisms 3017 and at least one seal ring 3022.

Figure 31:
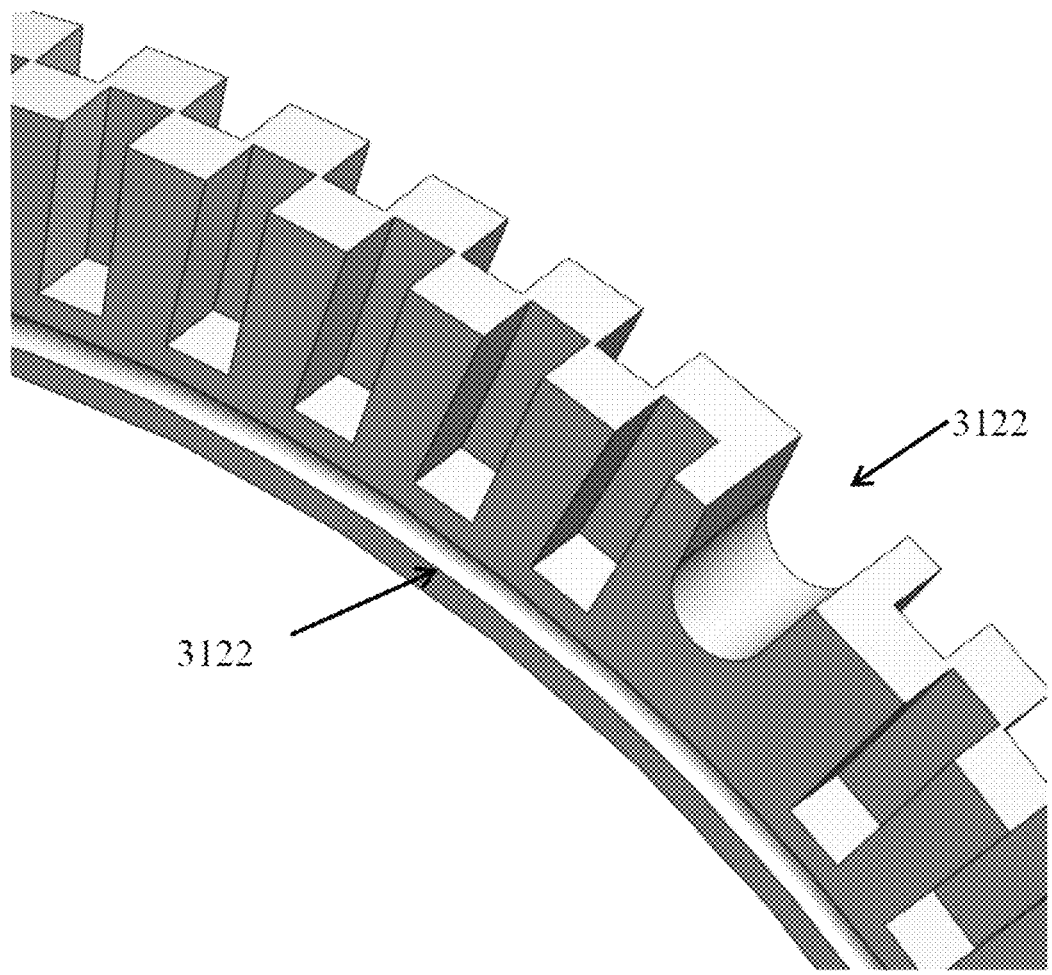
FIG. 31 illustrates a portion of a perspective view of another embodiment of a spacer member in accordance with various aspects as set forth herein.

FIG. 31 illustrates a portion of a perspective view of another embodiment of a spacer member 3100 in accordance with various aspects as set forth herein. In FIG. 31, the spacer member 3100 may be configured to include at least one seal ring 3122 and an alignment rod securing mechanism 3117.

Figure 32:
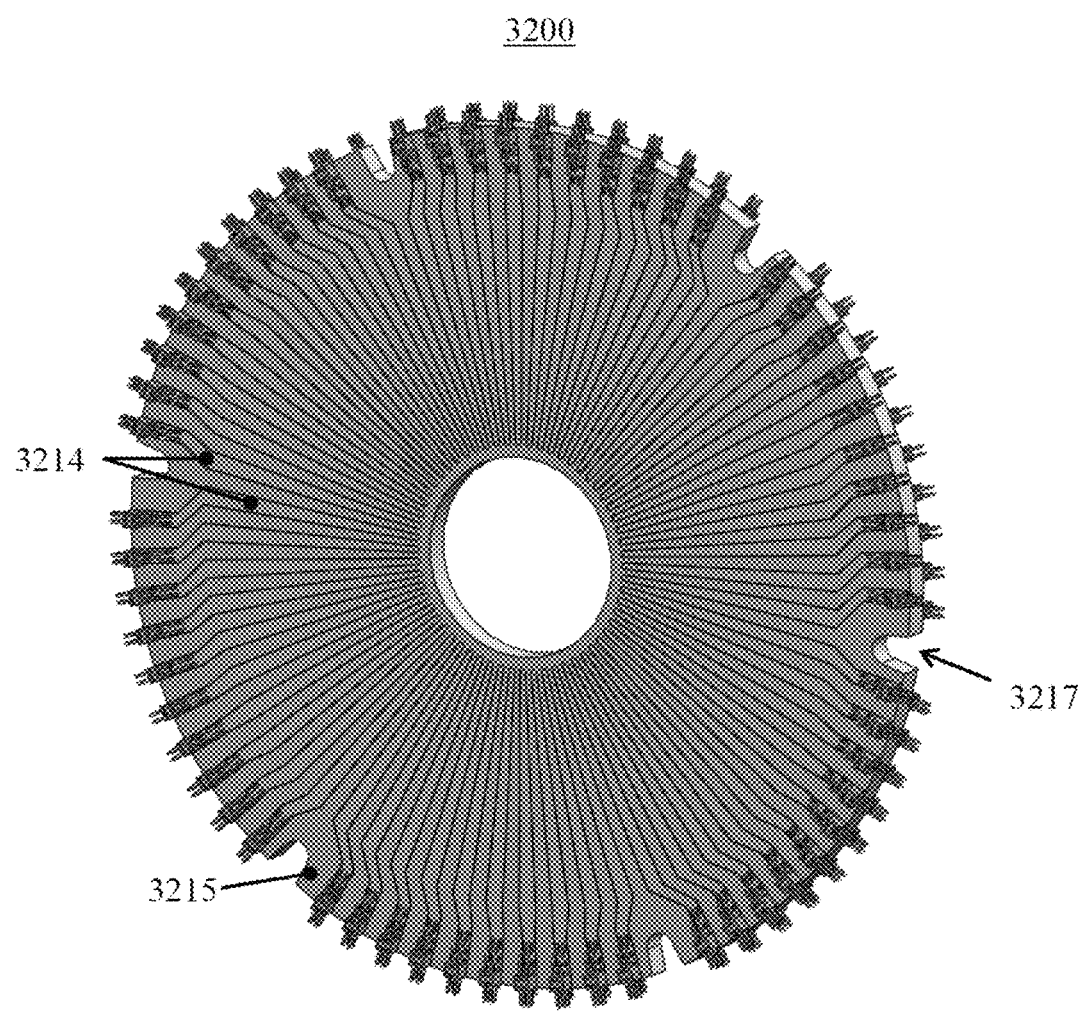
FIG. 32 illustrates a perspective view of another embodiment of a stator member assembly in accordance with various aspects as set forth herein.

FIG. 32 illustrates a perspective view of another embodiment of a stator member assembly 3200 in accordance with various aspects as set forth herein. In FIG. 32, the stator member assembly 3200 may be configured to include a stator member 3315 having a plurality of conductive poles 3214, an alignment rod securing mechanism 3217 and a plurality of petal connectors 3216.

Figure 33:
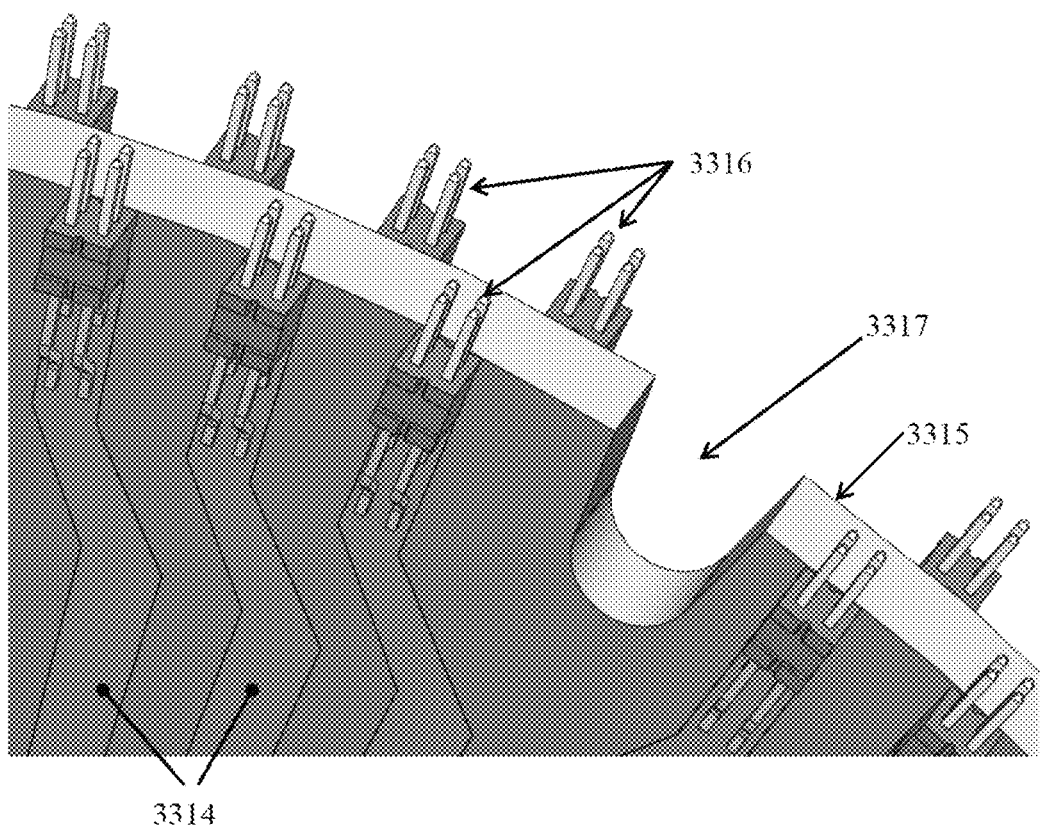
FIG. 33 illustrates a portion of a perspective view of another embodiment of a stator member assembly in accordance with various aspects as set forth herein.

FIG. 33 illustrates a portion of a perspective view of another embodiment of a stator member assembly 3300 in accordance with various aspects as set forth herein. In FIG. 33, the stator member assembly 3330 may be configured to include a stator member 3315 having a plurality of conductive poles 3314, an alignment rod securing mechanism 3317 and a plurality of petal connectors 3316.

Figure 34:
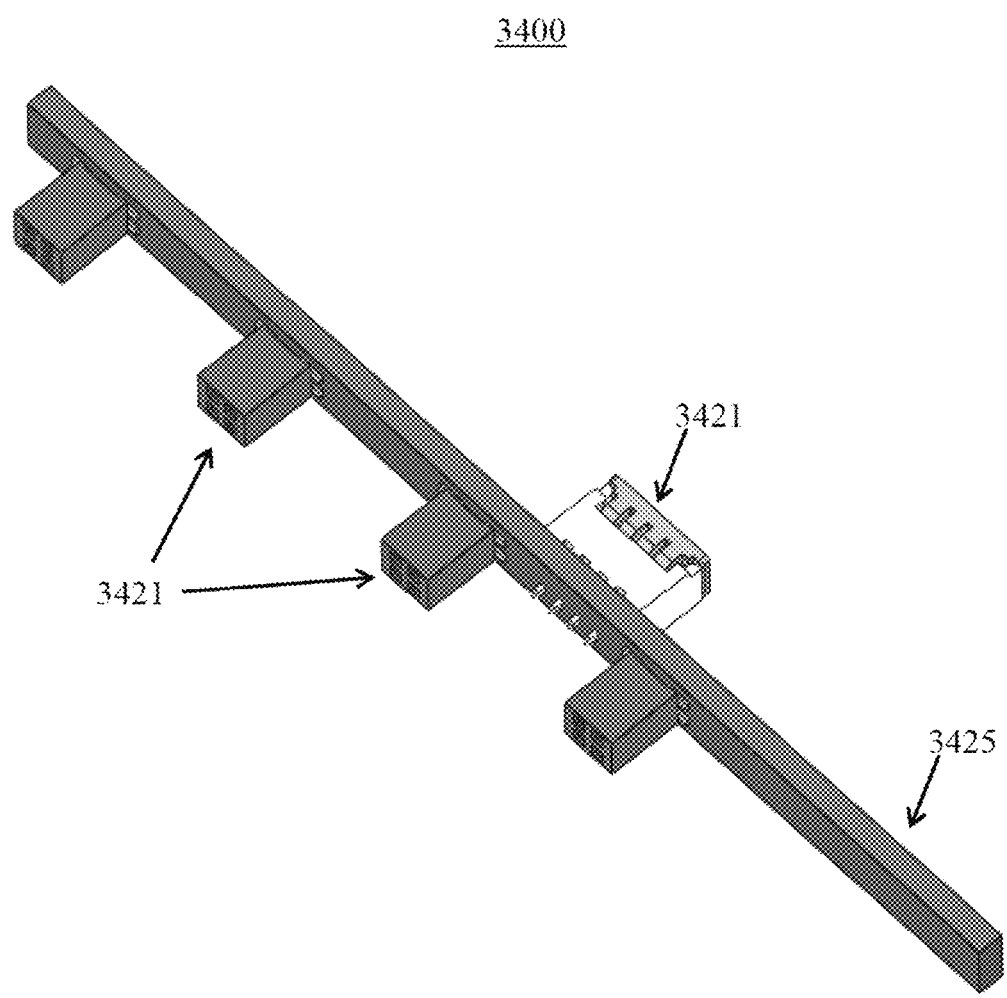
FIG. 34 illustrates a portion of a perspective view of one embodiment of a stator connector assembly in accordance with various aspects as set forth herein.

FIG. 34 illustrates a portion of a perspective view of one embodiment of a stator connector assembly 3400 in accordance with various aspects as set forth herein. In FIG. 34, the stator connector assembly 3400 may be configured to include a plurality of first connectors 3421 and a second connector 3425. The plurality of first connectors 3421 may be a plug, a receptacle or another type of electro-mechanical connector. The second connector 3425 may be a plug, a receptacle or another type of electro-mechanical connector.

Figure 35:
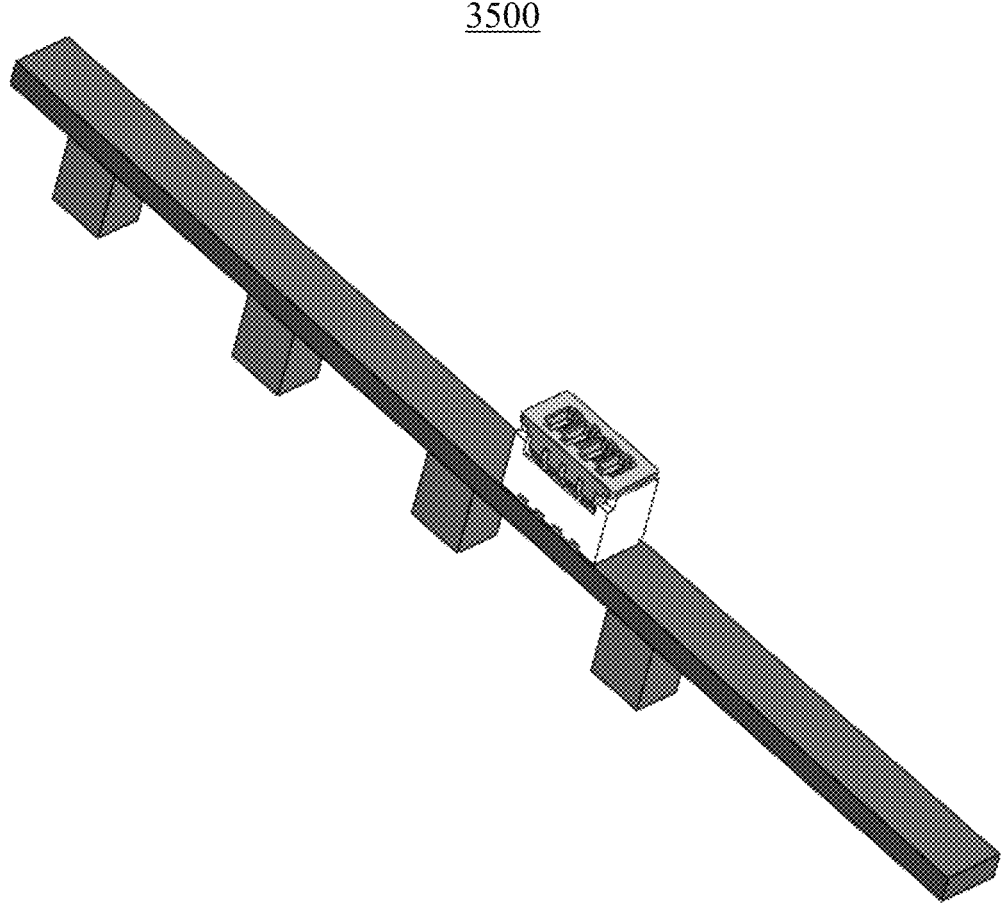
FIG. 35 illustrates a portion of a perspective view of another embodiment of a stator connector assembly in accordance with various aspects as set forth herein.

FIG. 35 illustrates a portion of a perspective view of another embodiment of a stator connector assembly 3500 in accordance with various aspects as set forth herein.

Figure 36:
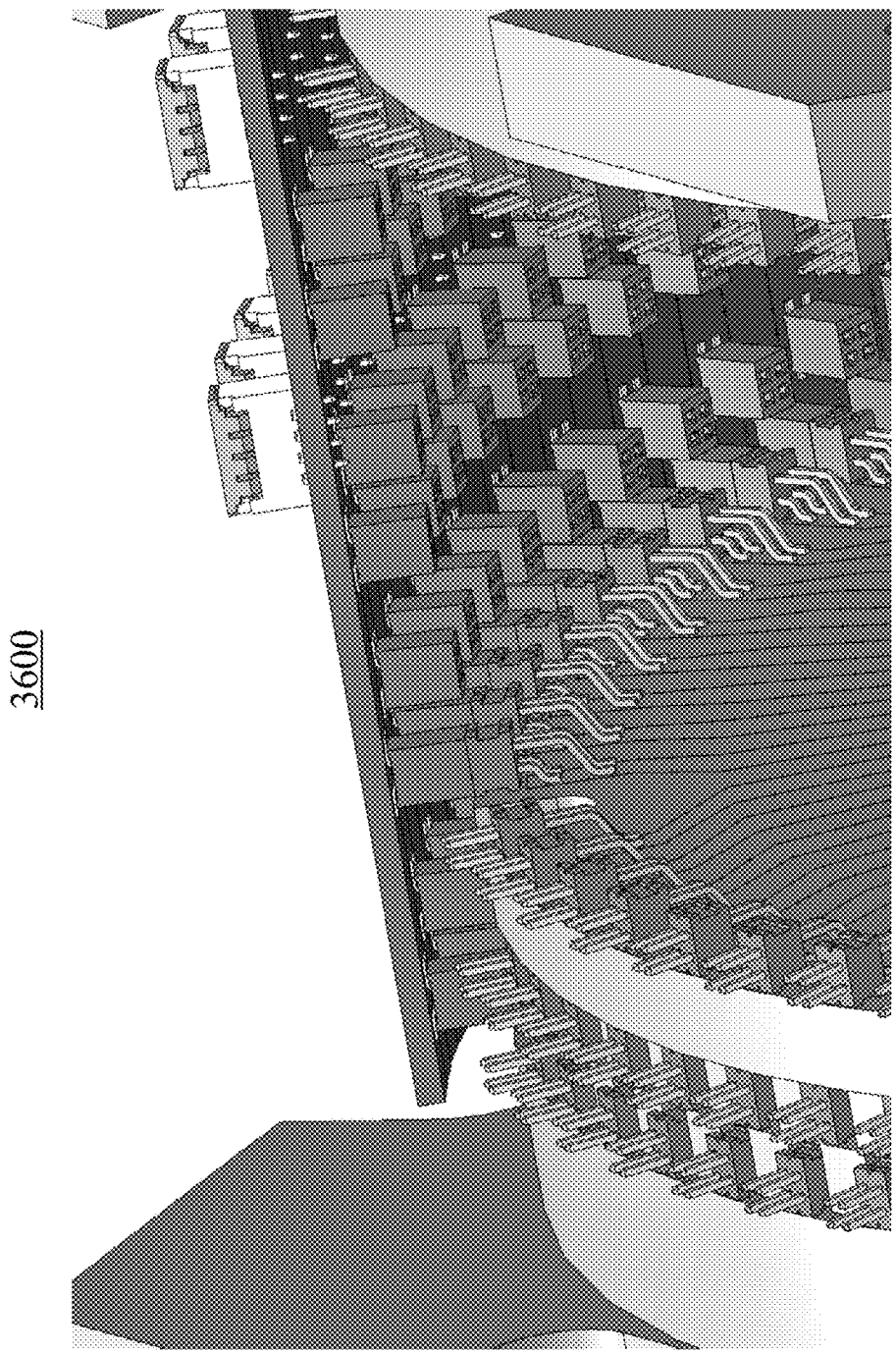
FIG. 36 illustrates a portion of a cutaway view of another embodiment of an electrostatic machine in accordance with various aspects as set forth herein.

FIG. 36 illustrates a portion of a cutaway view of another embodiment of an electrostatic machine 3600 in accordance with various aspects as set forth herein.

Figure 37:
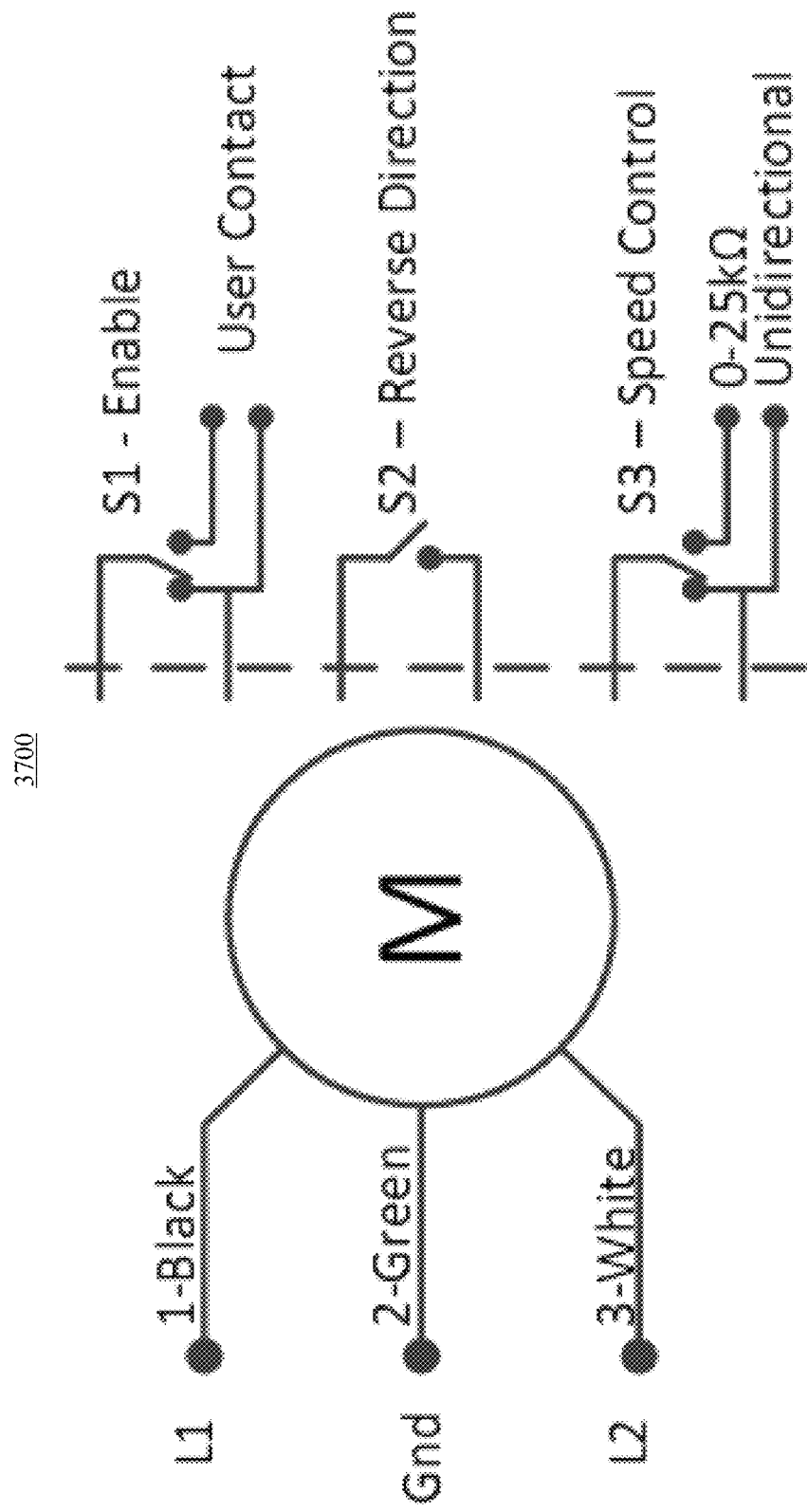
FIG. 37 illustrates one embodiment of a wiring schematic for an electrostatic machine in accordance with various aspects as set forth herein.

FIG. 37 illustrates one embodiment of a wiring schematic 3700 for an electrostatic machine in accordance with various aspects as set forth herein.

Figure 38:
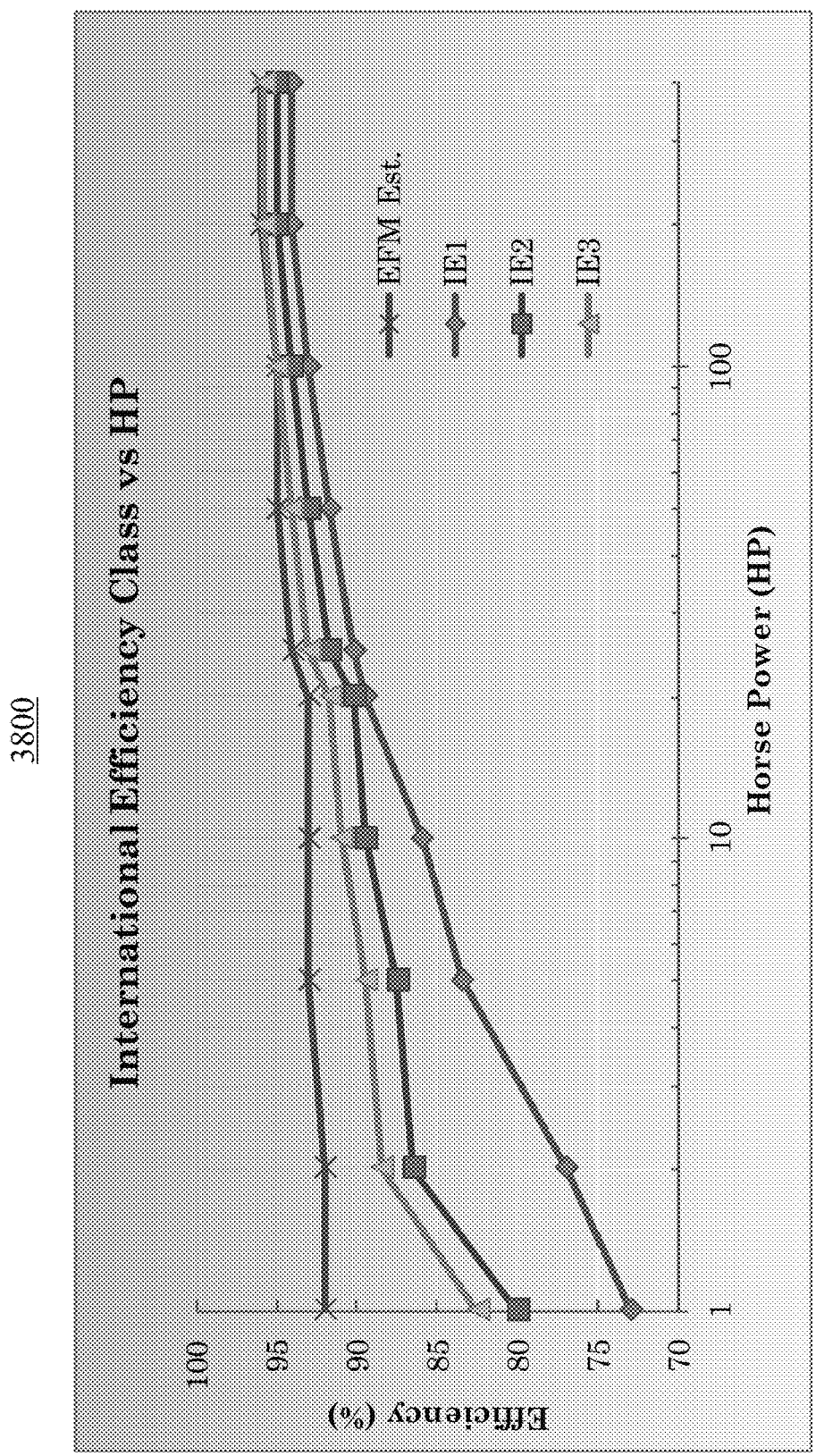
FIG. 38 provides a performance graph of another embodiment of an electrostatic machine in accordance with various aspects as set forth herein.

FIG. 38 provides a performance graph 3800 of another embodiment of an electrostatic machine in accordance with various aspects as set forth herein.

Figure 39:
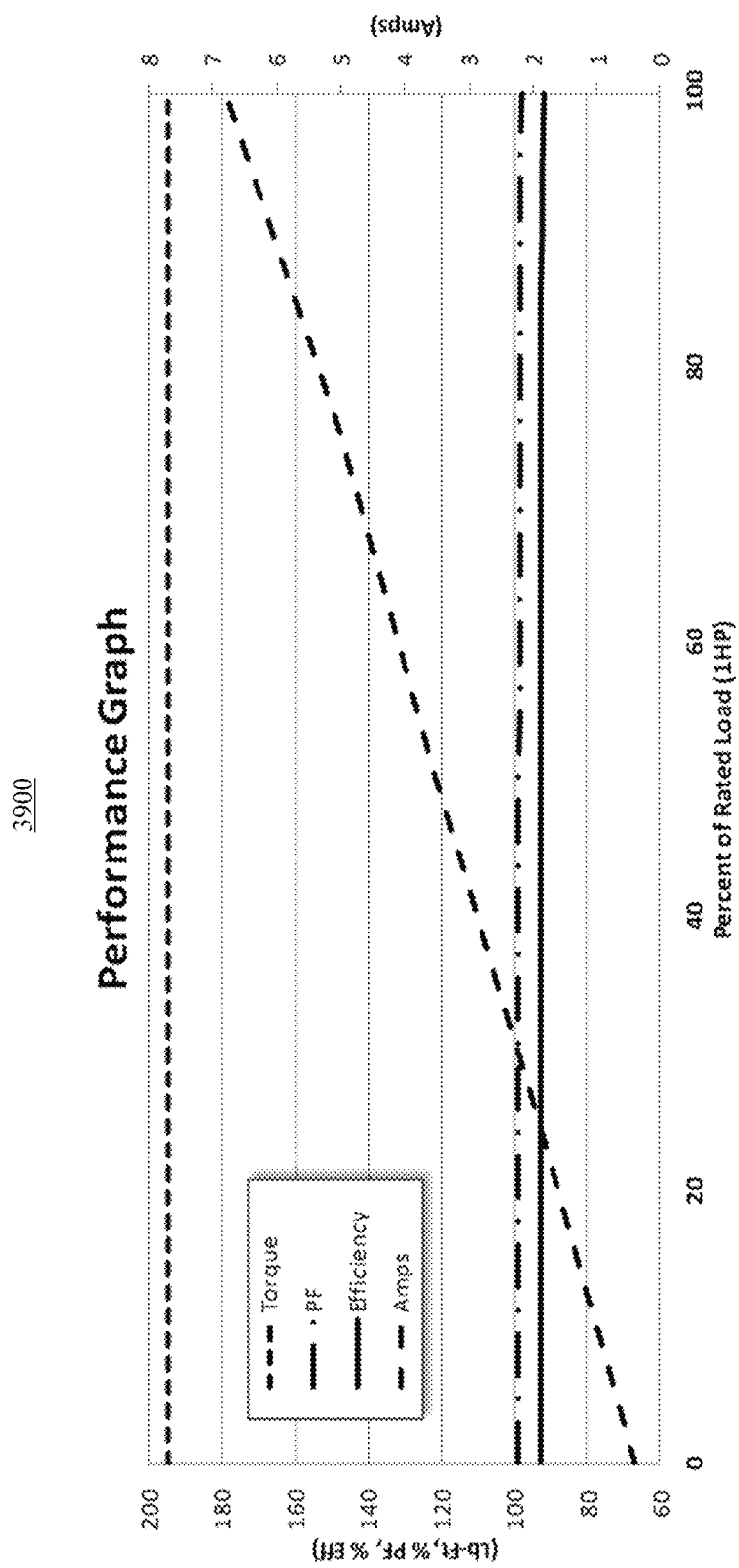
FIG. 39 provides another performance graph of another embodiment of an electrostatic machine in accordance with various aspects as set forth herein.

FIG. 39 provides another performance graph 3900 of another embodiment of an electrostatic machine in accordance with various aspects as set forth herein.

FIG. 40 provides a characteristics table 4000 of another embodiment of an electrostatic machine in accordance with various aspects as set forth herein.

Figure 41:
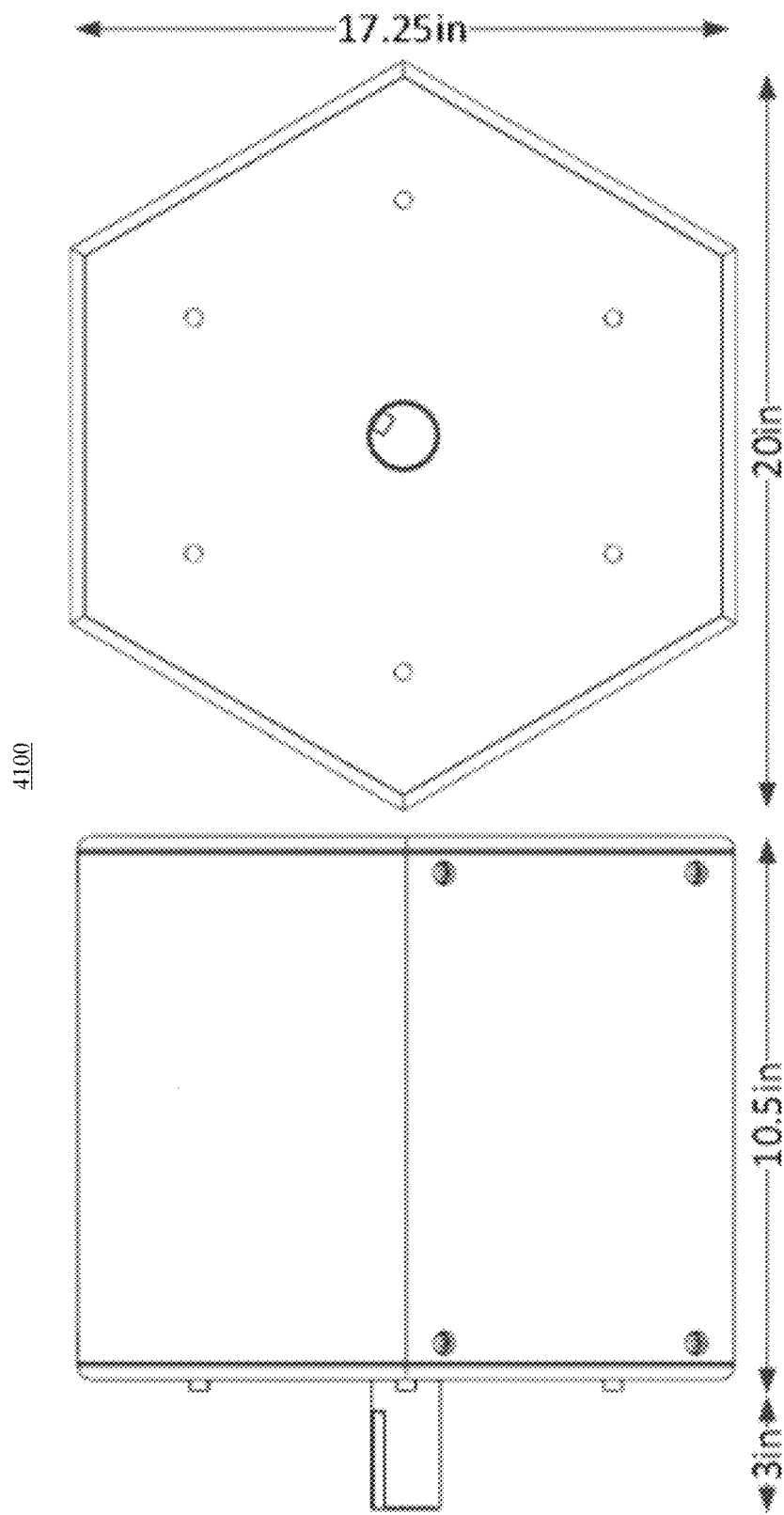
FIG. 41 illustrates dimensions of a height, a width and a length of another embodiment of an electrostatic machine in accordance with various aspects as set forth herein.

FIG. 41 illustrates dimensions of a height, a width and a length of another embodiment of an electrostatic machine 4100 in accordance with various aspects as set forth herein.

In another embodiment, an electrostatic machine may have a height, a length, or a width that is at least one thousand times ($\geq 1000\times$) a product of a gap distance and a pressure of the gap medium, wherein distance is measured with equal units and pressure is measured in atmosphere(s). A pressure of a gap medium may also be referred to as a gap pressure.

In another embodiment, an electrostatic machine may increase its electric force for a given voltage by decreasing a product of a gap distance and a gap pressure. In one example, the gap distance may be decreased while keeping the gap pressure about the same.

In another embodiment, an electrostatic machine may reduce the effects of thermal expansion or component tolerances such as stack-up error on a gap distance by allowing components of the electrostatic machine to mechanically slide or float between fixed points of the electrostatic machine while being held in affixed relative position.

In another embodiment, an electrostatic machine may reduce the effects of vibration by using a sensor to monitor and adjust a gap distance. A processor may be coupled to the sensor to receive, from the sensor, measurements of the gap distance. The processor may then output a gap distance adjustment to a plurality of spacer members whose thickness is variable to adjust the gap distance.

In another embodiment, an electrostatic machine may reduce the effects of vibration by using a sensor to monitor and adjust a gap pressure. A processor may be coupled to the sensor to receive, from the sensor, measurements of the gap pressure. The processor may then output a gap pressure adjustment to a variable bladder mechanism to adjust the gap pressure.

In another embodiment, an electrostatic machine may use a plurality of electromechanical connectors to couple a plurality of stator modular connector assemblies to a plurality of stator member assemblies. In one example, the plurality of electromechanical connectors may include geometric features that permit easy alignment, assembly or connection to the plurality of stator member assemblies.

An electrostatic machine may increase its force or torque capability by, for instance, increasing an electric field strength, increasing a conductive surface area, improving a permittivity of a gap medium. In one embodiment, an electrostatic machine may increase its force or torque capability by adding petals to a rotor member or a stator pole. In another embodiment, an electrostatic machine may increase a conductive surface area by increasing a size of a rotor pole and/or a stator pole.

In another embodiment, an electrostatic machine may include a plurality of stator members having at least one conductive pole on at least one surface of the plurality of stator members. Further, at least one of the plurality of stator members may be coated with at least one dielectric layer on the at least one surface of the stator member. The plurality of stator member may be arranged so that a small gap distance exists between adjacent stator members. Further, each of the plurality of stator members may be fixed in an aligned position by using a retaining part such as a rod or a tensioning mechanism.

In another embodiment, an electrostatic machine may include a plurality of stator members having at least one conductive pole on at least one surface of the plurality of stator members. Further, at least one of the plurality of stator members may be coated with at least one dielectric layer on the at least one surface of the stator member. The plurality of stator member may be arranged so that a small gap distance exists between adjacent rotor members. Further, each of the plurality of stator members may be fixed in an aligned position by using a retaining part such as a rod or a tensioning mechanism and spacer members. The plurality of stator and rotor members may be immersed to fill the gaps between the plurality of stator members with a gap medium such as a fluid. The fluid may be used to, for instance, inhibit voltage breakdown or improve permittivity.

In another embodiment, an electrostatic machine may include a plurality of stator members having at least one conductive pole on at least one surface of the plurality of stator members. The at least one conductive pole may have a specific geometric pattern to produce a sinusoidal, triangular, s-curve or rectangular force or torque profile for each of a plurality of voltage phases and/or pole when the electrostatic machine is in normal operation.

In another embodiment, an electrostatic machine may include an electric field motor, a rotor assembly and a motor drive having a charge recycle structure incorporated into a unified assembly, constituting a single structure. A housing may be used to encapsulate components of the electrostatic machine to improve cleanliness, safety or aesthetics, or to reduce internal or external interference such as electromagnetic interference. Further, the housing may be removable to allow, for instance, access to various components of the electrostatic machine.

In another embodiment, an electrostatic machine may be configured to have an electric field motor and a motor drive generating at least three watts (3 W) of power with a product of a gap pressure ($p_{gap}$) and a gap distance ($d_{gap}$) of less than ninety megapascals-micrometer (90 MPa*um).

In another embodiment, an electrostatic machine may be configured to have an electric field motor and a motor drive generating at least one hundred and fifty watts (150 W) of power with a product of a gap pressure ($p_{gap}$) and a gap distance ($d_{gap}$) of less than ninety megapascals-micrometer (90 MPa*um).

In another embodiment, an electrostatic machine may be configured to include an electric field motor and a motor drive generating at least three watts (3 W) of power with a magnitude of the product of a gap pressure ($p_{gap}$) and a gap distance ($d_{gap}$) less than or equal to a magnitude of each of a height, a length and a width of the electrostatic machine multiplied by two hundred fifty (250), wherein the distance measurements are in the same units.

In another embodiment, an electrostatic machine may be configured to include an electric field motor and a motor drive generating at least one hundred and fifty watts (150 W) of power with a magnitude of the product of a gap pressure ($p_{gap}$) and a gap distance ($d_{gap}$) less than or equal to a magnitude of each of a height, a length and a width of the electrostatic machine multiplied by two hundred fifty (250), wherein distance measurements are of the same units.

In another embodiment, an electrostatic machine may be configured to include an electric field motor, a rotor assembly and a motor drive using at least ten (10) petals on each rotor member of the rotor assembly and each stator member of the electric field motor.

In another embodiment, an electrostatic machine may be configured to include an electric field motor, a rotor assembly and a motor drive generating at least one-half (0.5) horsepower and weighing less than eight (8) pounds.

In another embodiment, an electrostatic machine may be configured to include an electric field motor, a rotor assembly and a motor drive generating at least one (1) horsepower while achieving at least eight-five percent (85%) efficiency.

In another embodiment, an electrostatic machine may be configured to include an electric field motor, a rotor assembly and a motor drive generating at least one (1) horsepower while achieving at least eight-five percent (85%) efficiency and utilizing a coating on at least one of the plurality of stator members to alter a breakdown voltage characteristics of the electrostatic machine.

In another embodiment, an electrostatic machine may be configured to include an electric field motor, a rotor assembly and a motor drive generating at least one (1) horsepower and having at least eight (8) poles per voltage phase of the electric field motor.

In another embodiment, an electrostatic machine may be configured to include an electric motor, a motor drive and a charge recycle structure. The electric field motor may be configured to include a plurality of stator members. Each of the plurality of stator members may include a plurality of electrically conductive petals. Further, the plurality of electrically conductive petals of each of the plurality of stator members may form a plurality of electrically isolated poles. Each of the plurality of electrically isolated poles may be coupled to one of a plurality of voltage phases of a voltage source. The rotor assembly may be configured to include a rotor member and a shaft member. The rotor member may be configured to have a plurality of electrically isolated conductive petals. The shaft member may be secured to the rotor member to form the rotor assembly. The charge recycle structure may be configured to recycle charge among the plurality of electrically isolated poles. In operation, the rotor assembly may be rotated upon application of the voltage source.

In another embodiment, in an electrostatic machine, each of a plurality of electrically conductive poles of a plurality of stator members may be axially distributed about a center of each of the plurality of stator members.

In another embodiment, in an electrostatic machine, each of a plurality of stator members may be circumferentially spaced apart around an inner cylindrical volume formed by the plurality of stator members.

In another embodiment, in an electrostatic machine, a plurality of electrically isolated conductive poles of a rotor member may be axially distributed about a center of the rotor member.

In another embodiment, in an electrostatic machine, a rotor member may be circumferentially positioned around an inner cylindrical volume formed by a plurality of stator members.

In another embodiment, in an electrostatic machine, a shaft member may be positioned in an inner cylindrical volume formed by a plurality of stator members.

In another embodiment, in an electrostatic machine, a rotor assembly may be coaxial to a plurality of stator members.

In another embodiment, in an electrostatic machine, a rotor assembly may be circumferentially freely moving between at least two of the plurality of stator members.

In another embodiment, in an electrostatic machine, an application of a voltage source may include switching each of a plurality of voltage phases of the voltage source to one of a plurality of electrically isolated poles at different times.

In another embodiment, an electrostatic machine may be configured to include a housing containing the electric field motor and the motor drive, wherein the housing has dimensions of a height, a length and a width.

In another embodiment, a housing of the electrostatic machine may be used to reduce electromagnetic interference.

In another embodiment, in an electrostatic machine, a magnitude of a product of a gap pressure ($p_{gap}$) and a gap distance ($d_{gap}$) may be less than or equal to the magnitude of each of a height, a length and a width of a housing of the electrostatic machine multiplied by one thousand (1,000).

In another embodiment, an electrostatic machine may generate at least three watts (3 W) of power with a product of a gap pressure ($p_{gap}$) and a gap distance ($d_{gap}$) of less than ninety megapascals-micrometer (90 MPa*um).

In another embodiment, an electrostatic machine may generate at least one hundred and fifty watts (150 W) of power with a product of a gap pressure ($p_{gap}$) and a gap distance ($d_{gap}$) of less than ninety megapascals-micrometer (90 MPa*um).

In another embodiment, an electrostatic machine may generate at least three watts (3 W) of power with a magnitude of a product of a gap pressure ($p_{gap}$) and a gap distance ($d_{gap}$) less than or equal to a magnitude of each of a height, a length and a width of the electrostatic machine multiplied by two hundred fifty (250), wherein distance measurements use the same units.

In another embodiment, an electrostatic machine may generate at least one hundred and fifty watts (150 W) of power with a magnitude of a product of a gap pressure ($p_{gap}$) and a gap distance ($d_{gap}$) less than or equal to a magnitude of each of a height, a length and a width of the electrostatic machine multiplied by two hundred fifty (250), wherein distance measurements use the same units.

In another embodiment, an electrostatic machine may use at least ten (10) petals on each rotor member and each stator member of the electrostatic machine.

In another embodiment, an electrostatic machine may generate at least one-half (0.5) horsepower and weigh less than eight (8) pounds.

In another embodiment, an electrostatic machine may be configured to include an electric field motor and a motor drive generating at least one (1) horsepower while achieving at least eight-five percent (85%) efficiency.

In another embodiment, in an electrostatic machine, at least one of a plurality of electrically conductive poles of a plurality of stator members may have a coating.

In another embodiment, in an electrostatic machine, at least one of a plurality of electrically isolated conductive poles of a rotor member may have a coating.

In another embodiment, in an electrostatic machine, a coating may be used to alter a voltage breakdown characteristic.

In another embodiment, an electrostatic machine may include a gap medium in a gap residing between each of a plurality of stator members and a rotor member.

In another embodiment, in an electrostatic machine, a gap medium may be a dielectric material.

In another embodiment, in an electrostatic machine, a gap medium such as deionized water or a combination of deionized water and hydrogen peroxide may be used to improve a permittivity of an electric field in a gap.

In another embodiment, in an electrostatic machine, a voltage source may be at least one hundred volts (100 V). Further, the electrostatic machine may produce a periodic force per each of a plurality of voltage phases of the voltage source resulting in a constant cyclic motion of a rotor assembly.

In another embodiment, in an electrostatic machine, a voltage source may be at least one hundred volts (100 V). Further, the electrostatic machine may produce a periodic torque per each of a plurality of voltage phases of the voltage source resulting in a constant cyclic motion of a rotor assembly.

In another embodiment, in an electrostatic machine, a product of gap distance and gap pressure may remain within a tolerance of within twenty five percent (25%) during operation over a temperature range of zero degrees centigrade (0° C.) to fifty degrees centigrade (50° C.).

In another embodiment, in an electrostatic machine, each of a plurality of stator members may include an electrically insulated substrate to support a plurality of electrically conductive poles or petals.

In another embodiment, in an electrostatic machine, a surface of an electrically insulated substrate may be chemically treated to improve its ability to bond with a coating.

In another embodiment, in an electrostatic machine, an electrically insulated substrate may be made using glass.

In another embodiment, in an electrostatic machine, an electrically insulated substrate may be made using a ceramic material.

In another embodiment, in an electrostatic machine, an electrically insulated substrate may be made using a resin.

In another embodiment, in an electrostatic machine, an electrically insulated substrate may be made using a polymer.

In another embodiment, in an electrostatic machine, an electrically insulated substrate may be made using a reinforced polymer.

In another embodiment, in an electrostatic machine, an electrically insulated substrate may be made using a composite material.

In another embodiment, in an electrostatic machine, a rotor member may include an electrically insulated substrate to support a plurality of electrically isolated conductive petals.

In another embodiment, an electrostatic machine may be configured to include a sensor and a voltage controller. The sensor may be configured to measure a gap distance between two of the plurality of stator members. The voltage controller may be configured to receive, from the sensor, a gap distance measurement. Further, the voltage controller may be configured to determine, in response to the gap distance measurement, an adjustment voltage to at least one of a plurality of voltage phases of a voltage source to reduce a risk of voltage breakdown of a gap medium. The voltage controller may adjust the at least one of the plurality of voltage phases of the voltage source using the adjustment voltage.

In another embodiment, an electrostatic machine may be configured to include a sensor and a voltage controller. The sensor may be configured to measure a gap pressure between two of a plurality of stator members. The voltage controller may be configured to receive, from the sensor, a gap pressure measurement. Further, the voltage controller may determine, in response to the gap pressure measurement, an adjustment voltage to at least one of a plurality of voltage phases of a voltage source to reduce a risk of voltage breakdown of a gap medium. The voltage controller may adjust the at least one of the plurality of voltage phases of the voltage source using the adjustment voltage.

In another embodiment, an electrostatic machine may be configured to include a coating or damping rings to reduce a vibration of a rotor member.

In another embodiment, in an electrostatic machine, each of a plurality of stator members may be a modular substrate design.

In another embodiment, in an electrostatic machine and enclosure, a modular substrate design may include a printed circuit board and a plurality of electrical connectors. The plurality of electrical connections may be used to expedite assembly of the electrostatic machine.

In another embodiment, in an electrostatic machine, each of a plurality of electrically isolated conductive petals of a rotor member may be used to produce a sinusoidal output force while in a constant cyclic motion.

In another embodiment, in an electrostatic machine, each of a plurality of electrically isolated conductive petals of a rotor member may be used to produce a sinusoidal output torque while in a constant cyclic motion.

In another embodiment, in an electrostatic machine, each of a plurality of electrically isolated conductive petals of a rotor member may be used to produce a triangular output force while in a constant cyclic motion.

In another embodiment, in an electrostatic machine, each of a plurality of electrically isolated conductive petals of a rotor member may be used to produce a triangular output torque while in a constant cyclic motion.

In another embodiment, in an electrostatic machine, each of a plurality of electrically isolated conductive petals of a rotor member may be used to produce an s-curve output force while in a constant cyclic motion.

In another embodiment, in an electrostatic machine, each of a plurality of electrically isolated conductive petals of a rotor member may be used to produce an s-curve output torque while in a constant cyclic motion.

In another embodiment, in an electrostatic machine, each of a plurality of electrically isolated conductive petals of a rotor member may be used to produce a rectangular output force while in a constant cyclic motion.

In another embodiment, in an electrostatic machine, each of a plurality of electrically isolated conductive petals of a rotor member may be used to produce a rectangular output torque while in a constant cyclic motion.

In another embodiment, in an electrostatic machine, each of a plurality of electrically isolated conductive petals of a rotor member may be used to produce a pulse output force while in a constant cyclic motion.

In another embodiment, in an electrostatic machine, each of a plurality of electrically isolated conductive petals of a rotor member may be used to produce a pulse output torque while in a constant cyclic motion.

In another embodiment, in an electrostatic machine, each of a plurality of electrically isolated conductive petals of a rotor member may be used to produce a periodic output force or torque while in a constant cyclic motion.

In another embodiment, in an electrostatic machine, a rotor assembly may continue to operate after removing the application of the voltage source.

The previous detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various examples, embodiments and the like, which may be described herein in terms of functional or logical block elements. Various techniques described herein may be used for an electrostatic machine. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Throughout the specification and the claims, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

In the previous description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

It is important to recognize that it is impractical to describe every conceivable combination of components or methodologies for purposes of describing the claimed subject matter. However, a person having ordinary skill in the art will recognize that many further combinations and permutations of the subject innovations are possible. Accordingly, the claimed subject matter is intended to cover all such alterations, modifications and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems described herein are in conjunction with an electrostatic machine, the skilled artisan will readily recognize that the example methods, devices and systems may be used in other methods, devices and systems and may be configured to correspond to such other example methods, devices and systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. An electrostatic machine comprising:
   an electric field motor including:
      a plurality of stator members, wherein each of the plurality of stator members includes a plurality of electrically conductive petals, wherein the plurality of electrically conductive petals of each of the plurality of stator members forms a plurality of electrically isolated poles with each of the plurality of electrically isolated poles coupled to one of a plurality of voltage phases of a voltage source;
   a rotor assembly including:
      a rotor member having a plurality of electrically isolated conductive petals; and
      a shaft member secured to the rotor member; and
   a motor drive having a charge recycle structure such that the motor drive is configured to output electrical power by continuously removing and repositioning charge among the plurality of electrically isolated poles, wherein the rotor assembly is rotated upon application of charges to at least some of the plurality of electrically isolated poles from the voltage source.

2. The electrostatic machine of claim 1, wherein the electrostatic machine uses at least ten (10) petals on each rotor member and each stator member of the electrostatic machine.

3. The electrostatic machine of claim 1, wherein at least one of the plurality of electrically conductive petals of the plurality of stator members has a coating, wherein the coating is used to alter a voltage breakdown characteristic.

4. The electrostatic machine of claim 1, further comprising a gap medium positioned in a gap residing between each of the plurality of stator members and the rotor member.

5. The electrostatic machine of claim 1, wherein the plurality of electrically isolated poles is at least eight poles per voltage phase.

6. An electrostatic machine comprising:
an electric field motor including:
a plurality of stator members, wherein each of the plurality of stator members includes a plurality of electrically conductive petals, wherein the plurality of electrically conductive petals of each of the plurality of stator members forms a plurality of electrically isolated poles with each of the plurality of electrically isolated poles coupled to one of a plurality of voltage phases of a voltage source;
a rotor assembly including:
a rotor member having a plurality of electrically isolated conductive petals; and
a shaft member secured to the rotor member; and
a motor drive having a charge recycle structure configured to cycle charge via a sequence of operations between the motor drive and the plurality of electrically isolated poles, the sequence of operations comprising repeatedly removing and replacing charge among the plurality of electrically isolated poles,
wherein the rotor assembly is rotated upon application of charges to at least some of the plurality of electrically isolated poles from the voltage source.

7. The electrostatic machine of claim 6, wherein, the electrostatic machine has a product of a gap pressure ($p_{gap}$) and a gap distance ($d_{gap}$) of less than ninety megapascals-micrometer (90 MPa *μm).

8. The electrostatic machine of claim 6, wherein the sequence of operations between the motor drive and the plurality of electrically isolated poles operates independent of the voltage source except for an initial charging and a replenish charging to compensate for any charge dissipation.

* * * * *